(12) United States Patent
Takazawa

(10) Patent No.: US 6,430,701 B1
(45) Date of Patent: Aug. 6, 2002

(54) DATA RECORDING AND REPRODUCING METHOD AND APPARATUS USING PLURALITY OF DATA RECORDING AND REPRODUCING UNITS, AND COMPUTER-READABLE RECORDING MEDIUM

(75) Inventor: Makoto Takazawa, Yokohama (JP)

(73) Assignee: Aiwa Co., Ltd., Tokyo (JP)

( * ) Notice: Subject to any disclaimer, the term of this patent is extended or adjusted under 35 U.S.C. 154(b) by 0 days.

(21) Appl. No.: 09/204,761

(22) Filed: Dec. 2, 1998

(30) Foreign Application Priority Data

Jan. 27, 1998 (JP) .......................................... 10-014091
Jan. 27, 1998 (JP) .......................................... 10-014092

(51) Int. Cl.⁷ .............................................. H02H 3/05
(52) U.S. Cl. ........................................ 714/6; 714/770
(58) Field of Search ..................................... 714/6, 770

(56) References Cited

U.S. PATENT DOCUMENTS

| | | | |
|---|---|---|---|
| 4,870,643 A | | 9/1989 | Bultman et al. ............ 371/11.1 |
| 5,088,081 A | | 2/1992 | Farr ............................ 369/54 |
| 5,191,584 A | | 3/1993 | Anderson ................... 371/51.1 |
| 5,265,098 A | * | 11/1993 | Mattson et al. |
| 5,390,327 A | * | 2/1995 | Lubbers et al. |
| 5,951,691 A | * | 9/1999 | Ng et al. |
| 5,951,693 A | * | 9/1999 | Walton et al. |
| 5,954,822 A | * | 9/1999 | Yashiro et al. |
| 5,974,502 A | * | 10/1999 | DeKoning et al. |
| 6,023,780 A | * | 2/2000 | Iwatani |
| 6,237,052 B1 | * | 5/2001 | Stolowitz |

* cited by examiner

Primary Examiner—Paul R. Myers
(74) Attorney, Agent, or Firm—David B. Abel; Squire, Sanders & Dempsey L.L.P.

(57) ABSTRACT

To record data, pieces of second data are produced by dividing supplied first data and an error correction code is added, and the pieces of second data and the error correction code are allocated to and recorded in a plurality of recording and reproducing units, respectively. To reproduce data, the first data is reproduced by synthesizing the pieces of second data read from the plurality of recording and reproducing units. If a fault occurs at any one of the plurality of recording and reproducing units, and if the faulty unit has recorded one of the second pieces of data, the first data is reproduced by reading the second pieces of data and error correction code recorded in the plurality of faultless recording and reproducing units, and if the faulty unit has not recorded one of the pieces of second data, the first data is reproduced by reading the pieces of second data recorded in the plurality of faultless recording and reproducing units. New pieces of second data are produced by diving the reproduced first data and a new error correction code is added, and the new pieces of second data and the new error correction code are allocated to and recorded in the plurality of faultless recording and reproducing units.

10 Claims, 13 Drawing Sheets

40-1  40-2  40-3  40-4  40-5  40-6  40-7  40-8

40-1                                                40-8

40-1                                                40-8

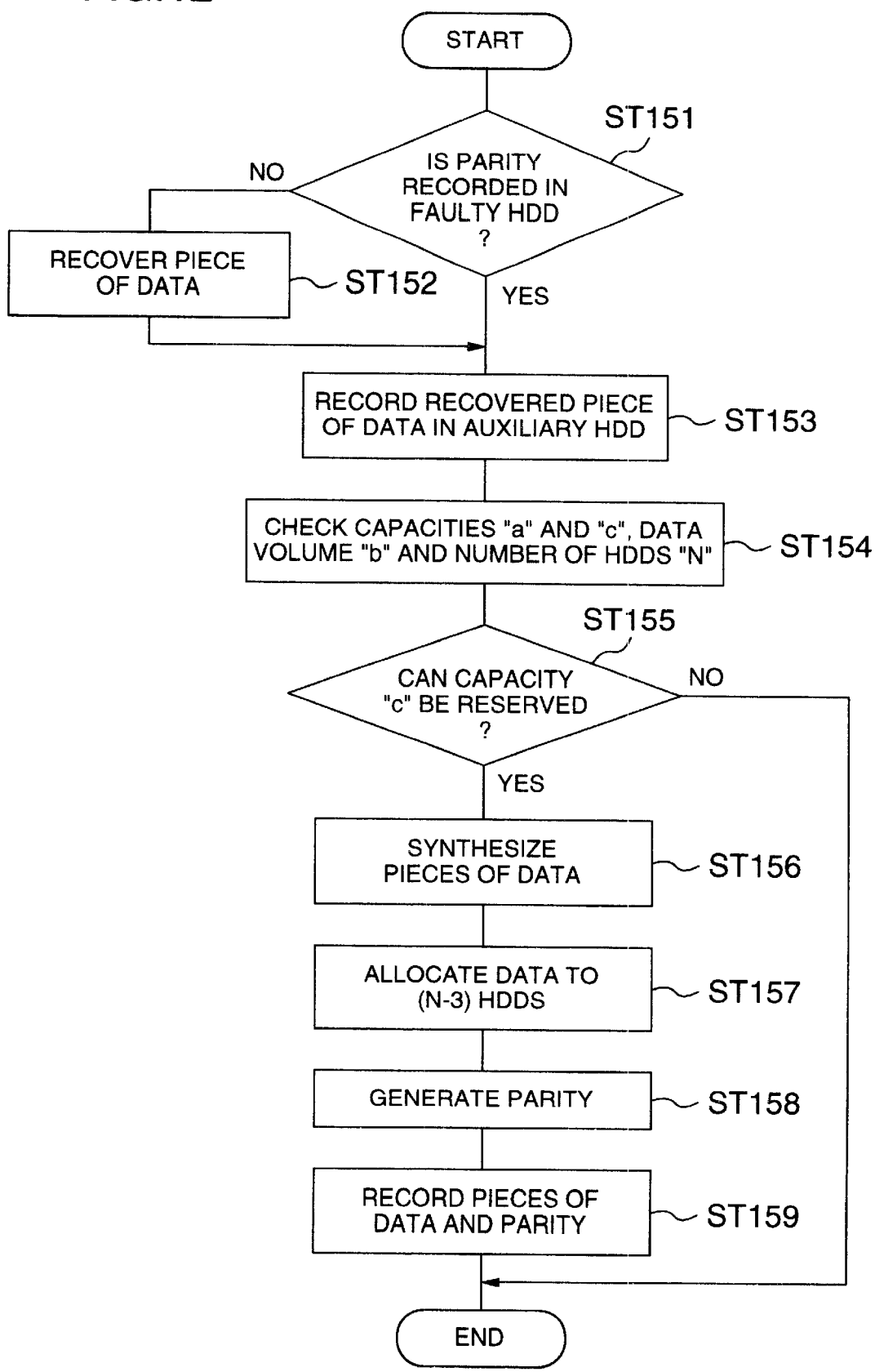

DATA RECORDING AND REPRODUCING METHOD AND APPARATUS USING PLURALITY OF DATA RECORDING AND REPRODUCING UNITS, AND COMPUTER-READABLE RECORDING MEDIUM

BACKGROUND OF THE INVENTION

The present invention relates to data recording and reproducing method and apparatus using a plurality of data recording and reproducing units, and a computer-readable recording medium. More specifically, the present invention is directed to data recording and reproducing method and apparatus using a plurality of recording and reproducing means that, at the time of data recording, produces pieces of second data by dividing supplied first data and adds an error correction code to the pieces of second data, allocates and records the pieces of second data and the error correction code to and in the plurality of recording and reproducing units, respectively, and that, at the time of data reproduction, reproduces the first data by synthesizing the pieces of second data read from the plurality of recording and reproducing units.

Known as a highly reliable data recording and reproducing apparatus having a large storage capacity is, e.g., a disk array (RAID or Redundant Array of Inexpensive Disks) unit that controls a plurality of data recording and reproducing units such as hard disk drives (hereinafter referred to as "HDD(s)") arranged in parallel to one another as if the HDDs were handled as a single disk unit.

To record data using such a disk array unit, the data to be recorded is divided, and the divided pieces of data are sequentially and cyclically allocated to and recorded in the plurality of HDDS. Further, an operation is performed to obtain a parity based on the divided pieces of data recorded in the plurality of HDDs. In a RAID level 3 or 4 system, the obtained parity is recorded in a single fixed HDD. In a RAID level 5 system, the obtained parities are regularly distributed to the respective HDDs.

To reproduce the data from the divided pieces of data recorded in the plurality of HDDS, the pieces of data read from the plurality of HDDs are subjected to an error detection correction using the recorded parity, and the resultant pieces of data are synthesized and outputted. Further, when a fault occurs at the disk array unit, a rebuilt process is performed. In the rebuild process, a faulty HDD is replaced with a new HDD and a piece of data recorded in the faulty HDD is written to the new HDD using the parity.

Since the disk array unit records data using a plurality of HDDs as described above, a large volume of data can be recorded. Further, since parity is used to make error detection correction and the rebuild process is performed to write back a piece of data to a newly replaced HDD, high reliability can be assured (prior art (1)). One such example is disclosed in U.S. Pat. No. 4,870,643.

Further, such a disk array unit reserves an auxiliary HDD. Therefore, when a fault occurs at an HDD, a so-called "hot standby" technique using the auxiliary HDD is utilized (prior art (2)). That is, a piece of data recorded in the faulty HDD is recovered by using pieces of data and a parity recorded in the faultless HDDS, and the recovered piece of data is recorded in the auxiliary HDD. In this technique, the data is thereafter recorded or reproduced by using the pieces of data recorded in the faultless HDDS and the piece of data recorded in the auxiliary HDD. Further, when the faulty HDD is replaced with a new HDD, the replaced HDD is reserved as the auxiliary HDD.

Since such a disk array unit records data in a plurality of HDDs as described above, a large volume of data can be recorded. In addition, since a parity is used to make error detection correction and an auxiliary HDD is reserved, high reliability can be assured.

SUMMARY OF THE INVENTION

By the way, the prior art (1) addresses the following problem. When a first fault occurs at the disk array unit, and if a second fault then occurs at another HDD during a period between the replacement of the faulty HDD with a new HDD and the completion of a rebuild process, then a piece of data in the second faulty HDD cannot be recovered by using a parity. Therefore, the recorded data cannot be read correctly.

Further, the prior art (2) in which the disk array unit has an auxiliary HDD also addresses the following problem. When a second fault occurs at an HDD during a period in which data is being recorded or reproduced using the auxiliary HDD and in which a first faulty HDD has not yet been replaced with a new HDD, a piece of data in the second faulty HDD can be recovered by using a parity. However, if a third fault occurs at an HDD, a piece of data in the third faulty HDD cannot be recovered by using a parity. Therefore, the recorded data cannot be read correctly.

An object of the present invention is to provide data recording and reproducing method and apparatus that can overcome the aforementioned problems addressed by the conventional data recording and reproducing method and apparatus.

Another object of the present invention is to provide data recording and reproducing method and apparatus that can improve reliability.

A first aspect of the present invention provides a data recording and reproducing method using a plurality of recording and reproducing means in which, at the time of data recording, pieces of second data are produced by dividing supplied first data and an error correction code is generated for the pieces of second data, and the pieces of second data and the error correction code are allocated to and recorded in the plurality of recording and reproducing means, respectively, and in which, at the time of data reproduction, the first data is reproduced by synthesizing the pieces of second data read from the plurality of recording and reproducing means. The method comprises the steps of: when a fault occurs at one of the plurality of recording and reproducing means (hereinafter referred to as the "faulty recording and reproducing means"), if one of the pieces of second data is recorded in the faulty recording and reproducing means, reproducing the first data by reading the pieces of second data and the error correction code recorded in the plurality of recording and reproducing means excluding the faulty recording and reproducing means (hereinafter referred to as the "faultless recording and reproducing means"), and if one of the pieces of second data is not recorded in the faulty recording and reproducing means, reproducing the first data by reading the pieces of second data recorded in the plurality of faultless recording and reproducing means; and producing new pieces of second data by dividing the reproduced first data and generating a new error correction code, and allocating and recording the new pieces of second data and the new error correction code to and in the plurality of faultless recording and reproducing means, respectively.

The first aspect of the present invention further provides a data recording and reproducing apparatus using a plurality of recording and reproducing means, which apparatus comprises: a plurality of recording and reproducing means; data processing means that, at the time of data recording, produces pieces of second data by dividing supplied first data and generates an error correction code, and allocates and records the pieces of second data and the error correction code to and in the plurality of recording and reproducing means, respectively, and that, at the time of data reproduction, reproduces the first data by synthesizing the pieces of second data read from the plurality of recording and reproducing means; and operation control means that, when a fault occurs at one of the plurality of recording and reproducing means (hereinafter referred to as the "faulty recording and reproducing means"), controls the data processing means, if one of the pieces of second data is recorded in the faulty recording and reproducing means, to reproduce the first data from the pieces of second data and the error correction code recorded in the plurality of recording and reproducing means excluding the faulty recording and reproducing means (hereinafter referred to as the "faultless recording and reproducing means"), and that controls the data processing means, if one of the pieces of second data is not recorded in the faulty recording and reproducing means, to reproduce the first data by reading the pieces of second data recorded in the plurality of faultless recording and reproducing means, produces new pieces of second data by dividing the reproduced first data based on a number of the plurality of faultless recording and reproducing means and generates a new error correction code, and allocates and records the new pieces of second data and the new error correction code to and in the plurality of faultless recording and reproducing means, respectively.

The first aspect of the present invention still further provides a computer-readable medium that comprises: computer-readable program code means that, at the time of data recording, produces pieces of second data by dividing supplied first data and generates an error correction code, and allocates and records the pieces of second data and the error correction code to and in a plurality of recording and reproducing means, respectively; computer-readable program code means that, at the time of data reproduction, reproduces the first data by synthesizing the pieces of second data read from the plurality of recording and reproducing means; and computer-readable program code means that, when a fault occurs at one of the plurality of recording and reproducing means (hereinafter referred to as the "faulty recording and reproducing means"), if one of the pieces of second data is recorded in the faulty recording and reproducing means, reproduces the first data by reading the pieces of second data and the error correction code recorded in the plurality of recording and reproducing means excluding the faulty recording and reproducing means (hereinafter referred to as the "faultless recording and reproducing means"), and if one of the pieces of second data is not recorded in the faulty recording and reproducing means, reproduces the first data by reading the pieces of second data recorded in the plurality of faultless recording and reproducing means, produces new pieces of second data by dividing the reproduced first data and generates a new error correction code, and allocates and records the new pieces of second data and the new error correction code to and in the plurality of faultless recording and reproducing means, respectively.

In the aforementioned invention that is organized as described above, supplied first data is divided and an error correction code is generated for the divided pieces of data, and the divided pieces of data and the error correction code are allocated to and recorded in the plurality of recording and reproducing means, respectively as pieces of second data. When a fault occurs at one of the plurality of recording and reproducing means, and if one of the pieces of second data or the error correction code cannot be read, the first data is reproduced by the pieces of second data and the error correction code or by the pieces of second data recorded in faultless recording and reproducing means. Then, the reproduced first data is divided in accordance with the faultless recording and reproducing means and an error correction code is generated for the divided pieces of data to produce new pieces of second data. The new pieces of second data are allocated to and recorded in the faultless recording and reproducing means, respectively, after it is confirmed that such new pieces of second data can be recorded in the faultless recording and reproducing means.

According to the aforementioned invention that is organized as described above, when a piece of second data cannot be read due to occurrence of a fault at one of a plurality of recording and reproducing means, first data is reproduced from the pieces of second data recorded in the faultless recording and reproducing means. Thereafter, the reproduced first data is divided in accordance with the faultless recording and reproducing means and an error correction code is generated for the divided pieces of data to produce new pieces of second data, and the new pieces of second data and the error correction code are allocated to and recorded in the faultless recording and reproducing means, respectively.

As a result, even if a fault occurs again at a recording and reproducing means, the first data can be reproduced from the new pieces of second data recorded in the faultless recording and reproducing means. Hence, reliability can be improved without increasing costs.

Further, when the second pieces of data are produced by dividing the first data, an error correction code is added to the second pieces of data. Therefore, the first data can be reproduced easily from the pieces of second data recorded in the faultless recording and reproducing means.

Still further, the new pieces of second data are recorded in the faultless recording and reproducing means after it is confirmed that the new pieces of second data can be recorded in the faultless recording and reproducing means. Therefore, the recording and reproducing means can be used efficiently to assure reliable operation.

A second aspect of the present invention provides a data recording and reproducing method using a plurality of recording and reproducing means in which, at the time of data recording, pieces of second data are produced by dividing supplied first data and an error correction code is generated, and the pieces of second data and the error correction code are allocated to and recorded in the plurality of first recording and reproducing means, respectively, and in which, at the time of data reproduction, the first data is reproduced by synthesizing the pieces of second data read from the plurality of first recording and reproducing means, and in which each of the plurality of first recording and reproducing means has a preset data recording area for recording either one of the pieces of second data or the error correction code. The method comprises the steps of: when a fault occurs at one of the plurality of first recording and reproducing means (hereinafter referred to as the "faulty first recording and reproducing means"), if one of the pieces of second data is recorded in the faulty first recording and reproducing means, reproducing the first data by reading the pieces of second data and the error correction code recorded in the plurality of first recording and reproducing means excluding the faulty first recording and reproducing means (hereinafter referred to as the "faultless recording and reproducing means"), and if one of the pieces of second data is not recorded in the faulty first recording and reproducing means, reproducing the first data by reading the pieces of second data recorded in the plurality of faultless first recording and reproducing means; and when new pieces of second data are produced by dividing the reproduced first data based on a number of the plurality of faultless first recording and reproducing means and a new error correction code is generated and the new pieces of second data and the new error correction code are allocated to the plurality of faultless first recording and reproducing means, respectively, if one of the new pieces of second data or the new error correction code cannot be written to each of the data recording areas of the plurality of faultless first recording and reproducing means, further producing new pieces of second data by dividing the reproduced first data based on a number of the plurality of faultless first recording and reproducing means and a second recording and reproducing means and further generating a new error correction code, and allocating and recording the further newly produced pieces of second data and the further newly generated error correction code to and in the plurality of faultless first recording and reproducing means and the second recording and reproducing means, respectively.

Further, in the second aspect of the present invention, at the time of data recording, pieces of second data are produced by dividing supplied first data and an error correction code is generated, and the pieces of second data and the error correction code are allocated to and recorded in the plurality of first recording and reproducing means, respectively, and at the time of data reproduction, the first data is reproduced by synthesizing the pieces of second data read from the plurality of first recording and reproducing means. When a fault occurs at one of the plurality of first recording and reproducing means (hereinafter referred to as the "faulty first recording and reproducing means"), if one of the pieces of second data is recorded in the faulty first recording and reproducing means, such one of the pieces of second data recorded in the faulty first recording and reproducing means is recovered by reading the pieces of second data and the error correction code recorded in the plurality of first recording and reproducing means excluding the faulty first recording and reproducing means (hereinafter referred to as the "faultless recording and reproducing means"), and the recovered one of the pieces of second data is recorded in a second recording and reproducing means, and thereafter the first data is reproduced by reading the pieces of second data recorded in the plurality of faultless first recording and reproducing means and the piece of second data recorded in the second recording and reproducing means, and new pieces of second data are produced by dividing the reproduced first data and a new error correction code is generated, and the new pieces of second data and the new error correction code are allocated to and recorded in the plurality of faultless first recording and reproducing means, respectively.

The second aspect of the present invention further provides a data recording and reproducing apparatus using a plurality of recording and reproducing means, which apparatus comprises: a plurality of first recording and reproducing means, each having a data recording area for recording either data or an error correction code; data processing means that, at the time of data recording, produces pieces of second data by dividing supplied first data and generates an error correction code, and allocates and records the pieces of second data and the error correction code to and in the plurality of first recording and reproducing means, respectively, and that, at the time of data reproduction, reproduces the first data from the pieces of second data and the error correction code read from the plurality of first recording and reproducing means; a second recording and reproducing means having a data recording area for recording either data or an error correction code; and operation control means that, when detecting a fault at one of the plurality of first recording and reproducing means (hereinafter referred to as the "faulty first recording and reproducing means"), controls the data processing means based on the detected result; wherein: when detecting no fault at the plurality of first recording and reproducing means, the operation control means reproduces the first data by allocating and recording the pieces of second data and the error correction code to and in the plurality of first recording and reproducing means, respectively, and by reading the pieces of second data and the error correction code allocated to and recorded in the plurality of first recording and reproducing means; when detecting the faulty first recording and reproducing means having recorded one of the pieces of second data among the plurality of first recording and reproducing means, the operation control means reproduces the first data by reading the pieces of second data and the error correction code recorded in the plurality of first recording and reproducing means excluding the faulty first recording and reproducing means (hereinafter referred to as the "faultless recording and reproducing means"); when detecting the faulty first recording and reproducing means not having recorded one of the pieces of second data among the plurality of first recording and reproducing means, the operation control means reproduces the first data by reading the pieces of second data recorded in the plurality of faultless first recording and reproducing means; and when new pieces of second data are produced by dividing the reproduced first data based on a number of the plurality of faultless first recording and reproducing means and a new error correction code is generated and the new pieces of second data and the new error correction code are allocated to the plurality of faultless first recording and reproducing means, respectively, if one of the new pieces of second data or the new error correction code cannot be written to each of the data recording areas of the plurality of faultless first recording and reproducing means, the operation control means further produces new pieces of second data by dividing the reproduced first data based on a number of the plurality of faultless first recording and reproducing means and the second recording and reproducing means and further generates a new error correction code, and allocates and records the further newly produced pieces of second data and the further newly generated error correction code to and in the plurality of faultless first recording and reproducing means and the second recording and reproducing means, respectively.

Further, the apparatus comprises: a plurality of first recording and reproducing means, each having a data recording area for recording either data or an error correction code; data processing means that, at the time of data recording, produces pieces of second data by dividing supplied first data and generates an error correction code, and allocates and records the pieces of second data and the error correction code to and in the plurality of first recording and reproducing means, respectively, and that, at the time of data reproduction, reproduces the first data from the pieces of second data and the error correction code read from the plurality of first recording and reproducing means; a second recording and reproducing means having a data recording area for recording either data or an error correction code; and operation control means that, when detecting a fault at one of the plurality of first recording and reproducing means (hereinafter referred to as the "faulty first recording and reproducing means"), controls the data processing means based on the detected result; wherein: when detecting no fault at the plurality of first recording and reproducing means, the operation control means reproduces the first data by allocating and recording the pieces of second data and the error correction code to and in the plurality of first recording and reproducing means, respectively, and by reading the pieces of second data and the error correction code allocated to and recorded in the plurality of first recording and reproducing means; when detecting the faulty first recording and reproducing means having recorded one of the pieces of second data among the plurality of first recording and reproducing means, the operation control means recovers such one of the pieces of second data recorded in the faulty first recording and reproducing means by reading the pieces of second data and the error correction code recorded in the plurality of first recording and reproducing means excluding the faulty first recording and reproducing means (hereinafter referred to as the "faultless recording and reproducing means"), and records the recovered one of the pieces of second data in the second recording and reproducing means; and the operation control means thereafter reproduces the first data by reading the pieces of second data recorded in the plurality of faultless first recording and reproducing means and the piece of second data recorded in the second recording and reproducing means, produces new pieces of second data by dividing the reproduced first data and generates a new error correction code, and allocates and records the new pieces of second data and the new error correction code to and in the plurality of faultless first recording and reproducing means, respectively.

The second aspect of the present invention still further provides a computer-readable medium that comprises: computer-readable program code means that, at the time of data recording, produces pieces of second data by dividing supplied first data and generates an error correction code, and allocates and records the pieces of second data and the error correction code to and in a plurality of first recording and reproducing means, respectively; computer-readable program code means that, at the time of data reproduction, reproduces the first data by synthesizing the pieces of second data read from the plurality of first recording and reproducing means; computer-readable program code means that, when a fault occurs at one of the plurality of first recording and reproducing means (hereinafter referred to as the "faulty first recording and reproducing means"), if one of the pieces of second data is recorded in the faulty first recording and reproducing means, reproduces the first data by reading the pieces of second data and the error correction code recorded in the plurality of first recording and reproducing means excluding the faulty first recording and reproducing means (hereinafter referred to as the "faultless recording and reproducing means"), and if one of the pieces of second data is not recorded in the faulty first recording and reproducing means, reproduces the first data by reading the pieces of second data recorded in the plurality of faultless first recording and reproducing means; and computer-readable program code means that, when new pieces of second data are produced by dividing the reproduced first data based on a number of the plurality of faultless first recording and reproducing means and a new error correction code is generated and the new pieces of second data and the new error correction code are allocated to the plurality of faultless first recording and reproducing means, respectively, if one of the new pieces of second data or the new error correction code cannot be written to each of the data recording areas of the plurality of faultless first recording and reproducing means, further produces new pieces of second data by dividing the reproduced first data based on a number of the plurality of faultless first recording and reproducing means and a second recording and reproducing means and further generating a new error correction code, and allocates and records the further newly produced pieces of second data and the further newly generated error correction code to and in the plurality of faultless first recording and reproducing means and the second recording and reproducing means, respectively.

Further, the computer-readable medium comprises: computer-readable program code means that, at the time of data recording, produces pieces of second data by dividing supplied first data and generates an error correction code, and allocates and records the pieces of second data and the error correction code to and in a plurality of first recording and reproducing means, respectively; computer-readable program code means that, at the time of data reproduction, reproduces the first data by synthesizing the pieces of second data read from the plurality of first recording and reproducing means; computer-readable program code means that, when a fault occurs at one of the plurality of first recording and reproducing means (hereinafter referred to as the "faulty first recording and reproducing means"), if one of the pieces of second data is recorded in the faulty first recording and reproducing means, recovers such one of the pieces of second data recorded in the faulty first recording and reproducing means by reading the pieces of second data and the error correction code recorded in the plurality of first recording and reproducing means excluding the faulty first recording and reproducing means (hereinafter referred to as the "faultless recording and reproducing means"), and records the recovered one of the pieces of second data in a second recording and reproducing means; and computer-readable program code means that thereafter reproduces the first data by reading the pieces of second data recorded in the plurality of faultless first recording and reproducing means and the piece of second data recorded in the second recording and reproducing means, produces new pieces of second data by dividing the reproduced first data and generates a new error correction code, and allocates and records the new pieces of second data and the new error correction code to and in the plurality of faultless first recording and reproducing means, respectively.

In the second aspect of the invention, when faults occur at a plurality of recording and reproducing means having recorded pieces of second data obtained by dividing the first data, the first data is reproduced by reading the pieces of second data from the plurality of faultless recording and reproducing means. When new pieces of second data are produced by dividing the reproduced first data and allocated to a plurality of faultless recording and reproducing means, and if the new pieces of second data cannot be recorded in these faultless recording and reproducing means due to large volumes of data recorded in such faultless recording and reproducing means, then new pieces of second data are further produced by dividing the reproduced first data and the further newly produced pieces of second data are recorded in the faultless recording and reproducing means and an auxiliary recording and reproducing means. When a fault occurs, a piece of second data recorded in the faulty recording and reproducing means is recovered by using the error correction code, and the recovered piece of second data is recorded in the auxiliary recording and reproducing means. Thereafter, the first data is reproduced from the pieces of second data recorded in the faultless recording and reproducing means and the auxiliary recording and reproducing means, and the reproduced first data is divided, and the divided pieces of data are allocated to the faultless recording and reproducing means as new pieces of second data.

According to the second aspect of the present invention, when the reproduced first data is divided, and the divided pieces of data are allocated to the faultless recording and reproducing means as new pieces of second data, and if such new pieces of second data cannot be recorded due to, e.g., large volumes of data recorded in the faultless recording and reproducing means, then the reproduced first data is further divided and the further divided pieces of data are allocated to the faultless recording and reproducing means and the auxiliary recording and reproducing means.

As a result, even if a second fault occurs at one of the recording and reproducing means before the completion of a rebuild process, the first data can be obtained by recovering the piece of second data recorded in the second faulty recording and reproducing means. Hence, reliability can be improved. Further, since one of the pieces of second data can be allocated to the auxiliary recording and reproducing means, the recovery process can be performed efficiently while reserving one of th e recording and reproducing means as the auxiliary one.

Further, the piece of second data recorded in the faulty recording and reproducing means is recovered by using the error correction code, and the recovered piece of second data is recorded in the auxiliary recording and reproducing means. Thereafter, the first data is reproduced from the pieces of second data recorded in the faultless recording and reproducing means and the auxiliary recording and reproducing means, and the reproduced first data is divided and the divided pieces of data are allocated to the faultless recording and reproducing means as new pieces of second data.

As a result, even if the first data is read before the first data that has been synthesized after the occurrence of a fault is reallocated to and recorded in the plurality of the faultless recording and reproducing means, the first data can be recorded swiftly since the piece of second data recorded in the faulty recording and reproducing means is recovered in the auxiliary recording and reproducing means. When the allocation of the synthesized first data is complete, the auxiliary recording and reproducing means can be reserved again. Therefore, even if a fault occurs again at one of the recording and reproducing means before the completion of a rebuild process, a piece of second data recorded in the faulty recording and reproducing means is recovered and the first data is reproduced by using such recovered piece of second data. Hence, reliability can be improved.

BRIEF DESCRIPTION OF THE DRAWINGS

FIG. 12 is a flowchart for explaining the second recovery process in the data recording and reproducing apparatus according to the second embodiment.

DESCRIPTION OF THE PREFERRED EMBODIMENTS

Data recording and reproducing methods and apparatuses, which are embodiments of the present invention, will now be described in detail with reference to the accompanying drawings.

First, a data recording and reproducing apparatus having no auxiliary recording and reproducing unit (HDD), which is a first embodiment of the invention, will be described.

Figure 1:
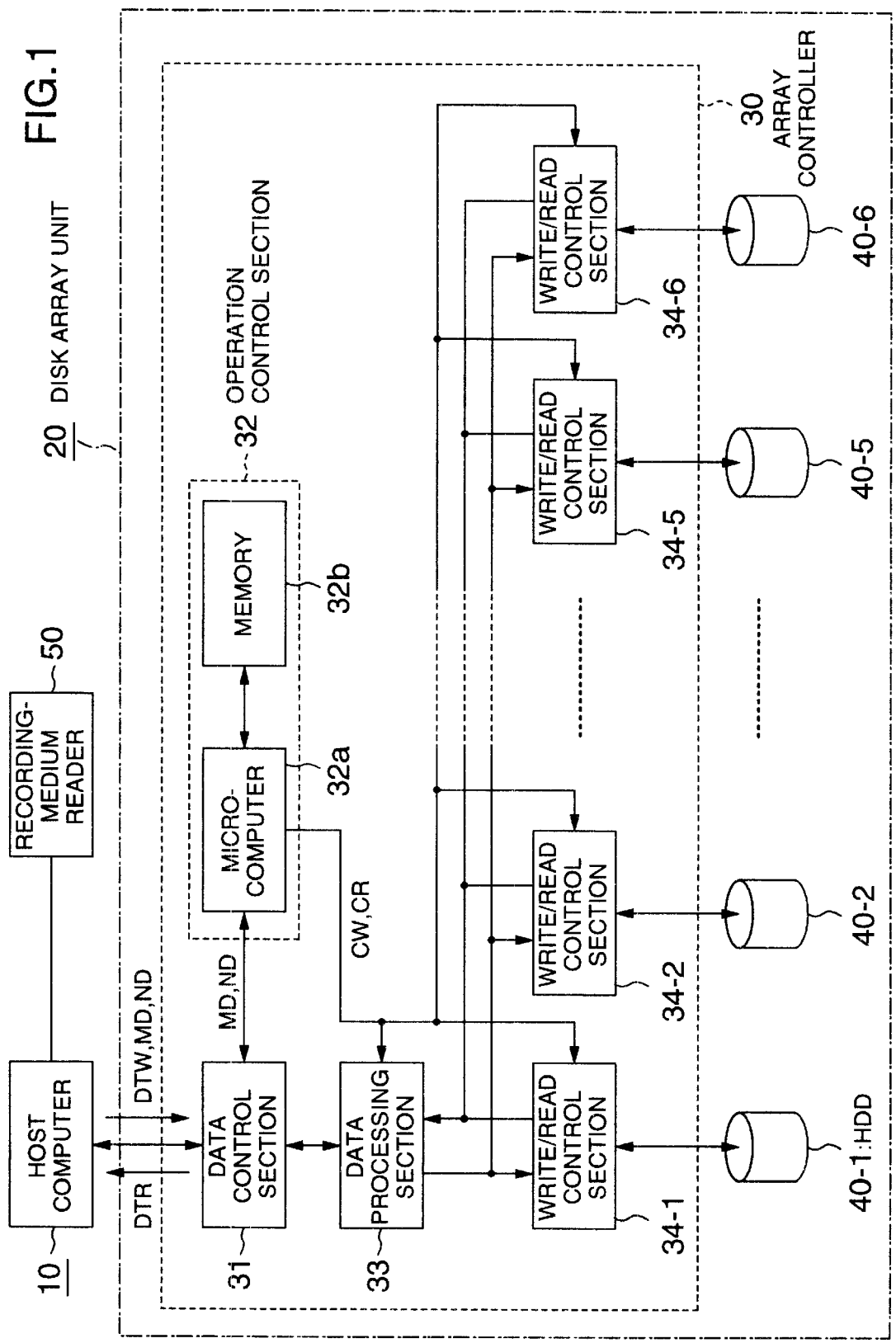
FIG. 1 is a block diagram showing an exemplary construction of a data recording and reproducing apparatus, which is a first embodiment of the present invention.

FIG. 1 shows an exemplary construction of the data recording and reproducing apparatus according to the first embodiment. A host computer 10 supplies recording data DTW together with command data MD to a disk array unit 20 that is the data recording and reproducing apparatus. The command data MD is used for data writing and indicates the volume and position of the recording data.

The disk array unit 20 includes an array controller 30 and a plurality of data recording and reproducing units (HDDs in this embodiment), e.g., six HDDs 40-1 to 40-6.

A data control section 31 of the array controller 30 that is connected to the host computer 10 separates the recording data DTW from the command data MD, both supplied from the host computer 10. After the separation, the command data MD is supplied to an operation control section 32, and the recording data DTW to a data processing section 33.

The operation control section 32 has a micro-computer (hereinafter referred to as "micom") 32a that controls an operation, and a memory 32b that stores a program for causing the micom 32a to control the operation. The memory 32b may be one storing the program in advance. A program-writable memory may also be used as the memory 32b. In the latter case, the program stored in a computer-readable recording medium (e.g., a floppy disk, an optical disk or the like) is read by a recording-medium reader 50 connected to the host computer 10, and the read program is written to the memory 32*b* through the data control section 31. Also acceptable may be a technique in which the host computer 10 is connected to a network (not shown) and in which the program is downloaded to the memory 32*b* through the network.

The operation control section 32 functions as follows. The micom 32*a*, by controlling the operation in accordance with the program stored in the memory 32*b*, determines the volume of the recording data DTW, its writing position in each HDD 40, and the like based on the command data MD from the host computer 10 and generates a write control signal CW. The write control signal CW is supplied to the data processing section 33 and write/read control sections 34-1 to 34-6.

The data processing section 33 performs an allocation process by which the recording data DTW can be sequentially and cyclically allocated to and recorded in the plurality of HDDs based on the write control signal CW. The data processing section 33 also generates a parity PT, which is an error correction code, based on data WS obtained by the allocation process.

If it is supposed that the disk array unit 20 is of a RAID level 3 system and is to allocate and write recording data to the HDDs 40-1 to 40-5 and to write a parity PT to the HDD 40-6, then pieces of data WS-1 to WS-5 obtained by allocating the data are supplied to the write/read control sections 34-1 to 34-5 corresponding to the HDDS 40-1 to 40-5. Further, the generated parity PT is supplied to the write/read control section 34-6 corresponding to the HDD 40-6.

The write/read control section 34-1 performs a write process by which the piece of data WS-1 supplied from the data processing section 33 is written sequentially from the position specified by the command data MD under the control of the HDD 40-1 by the write control signal Cw. Further, the write/read control sections 34-2 to 34-6 similarly write the pieces of data WS-2 to WS-5 and the parity PT to the HDDs 40-2 to 40-6 sequentially based on the write control signal CW.

Further, when command data ND for reading data recorded in the disk array unit 20 is supplied to the micom 32*a* from the host computer 10 through the data control section 31, the operation control section 32 supplies a read control signal CR to the write/read control sections 34-1 to 34-6 based on the command data ND.

The write/read control sections 34-1 to 34-6 controls the HDDs 40-1 to 40-6 based on the read control signal CR, so that the recorded pieces of data WS-1 to WS-5 and parity PT are sequentially read from the positions specified by the command data ND. The read pieces of data WS-1 to WS-5 and parity PT are supplied to the data processing section 33.

The data processing section 33 performs an error correction process to which the read pieces of data WS-1 to WS-5 are subjected using the read parity PT. The error-corrected pieces of data WS-1 to WS-5 are subjected to a synthesis process so that they are recovered to what they were before the allocation process, and the resultant data is supplied to the host computer 10 as reproduced data DTR through the data control section 31.

When any one of the HDDs 40-1 to 40-6 generates a signal indicating occurrence of a fault and supplies it to the operation control section 32, the section 32 determines which HDD is in fault. Further, each of the write/read control sections 34-1 to 34-6 also detects a fault occurring at any one of the HDDs 40-1 to 40-6 during their data writing or reading operations, and supplies a signal indicating the detected result to the operation control section 32 so that the section 32 can determine which HDD is in fault. In the latter case, the write/read control sections 34-1 to 34-6 may detect occurrence of a fault not only during their data writing or reading operations, but, e.g., periodically at a predetermined time interval as well.

Figure 2:
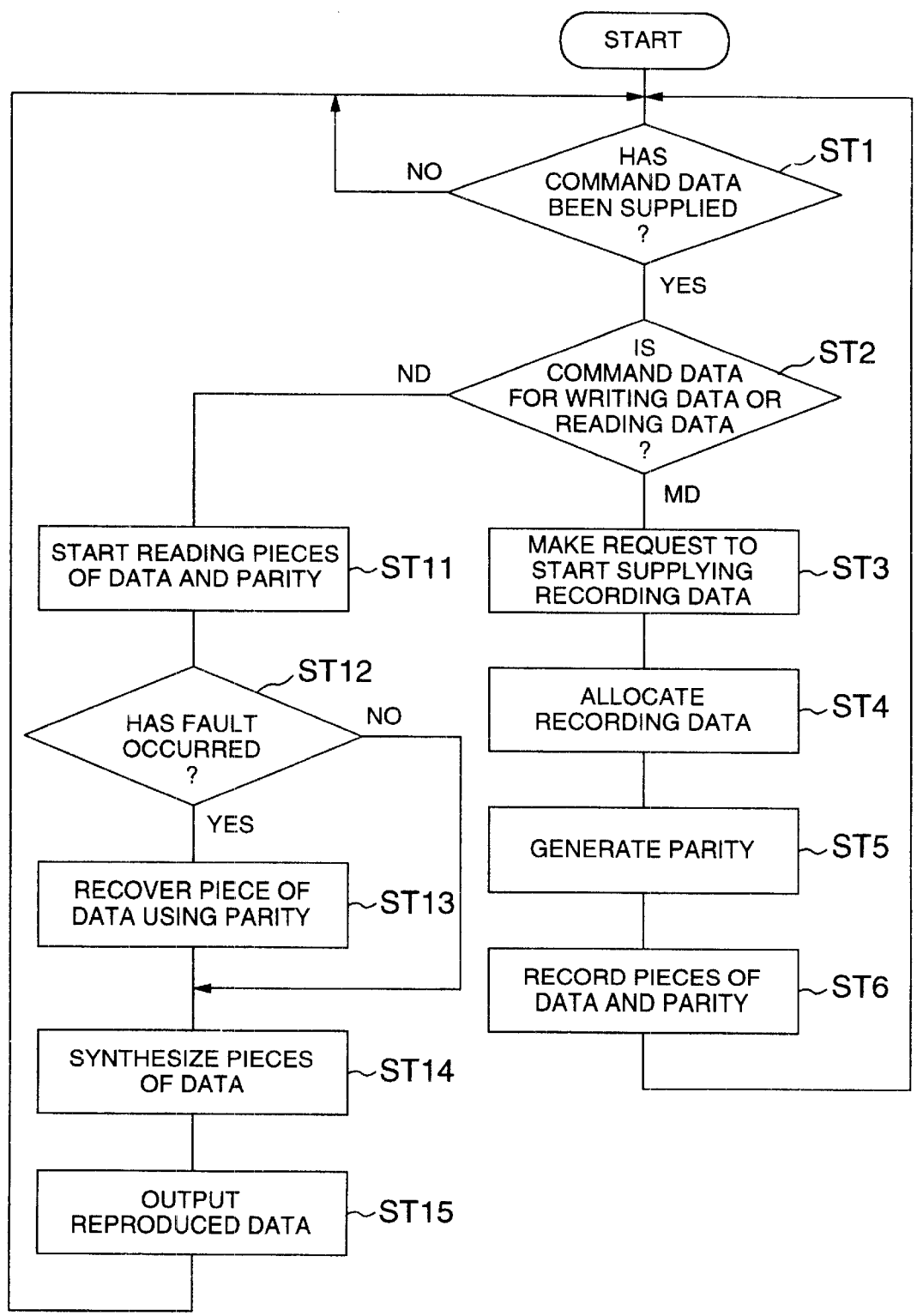
FIG. 2 is a flowchart for explaining an operation of the data recording and reproducing apparatus according to the first embodiment.

Then, the operation of the disk array unit 20 will be described with reference to a flowchart shown in FIG. 2. In the following operation, the micom 32*a* reads a procedure of the program recorded in the memory 32*b* within the operation control section 32 whenever necessary, and control is effected in accordance with the read procedure. For simplicity of explanation, the volume of data of a parity PT equals that of a piece of data to be recorded in each HDD.

First, in Step ST1, whether or not the host computer 10 has supplied command data is determined. If the answer is negative, Step ST1 is repeated, and if positive, the operation proceeds to Step ST2.

In Step ST2, the type of the command data is identified. If the command data is command data MD for recording data in the disk array unit 20, the operation proceeds to Step ST3. If it is command data ND for reading data recorded in the disk array unit 20, the operation jumps to Step ST 11.

In Step ST3, the operation control section 32 of the disk array unit 20 requests the host computer 10 through the data control section 31 to start supplying recording data DTW, and then the operation proceeds to Step ST4.

In Step ST4, the data processing section 33 subjects the recording data DTW supplied from the host computer 10 through the data control section 31 to an allocation process. Since the disk array unit 20 is of the RAID level 3 system and there are six HDDs in this embodiment as described above, the recording data DTW is divided into pieces of data WS-1 to SW-5 by the allocation process.

In the next Step ST5, the data processing section 33 generates a parity PT based on the pieces of data WS-1 to WS-5, and then the operation proceeds to Step ST6.

In Step ST6, the HDDs 40-1 to 40-6 record the pieces of data WS-1 to WS-5 and the parity PT, respectively, and then the operation returns to Step ST1.

When the command data supplied from the host computer 10 is identified as the command data ND for reading the recorded data in Step ST2 and the operation proceeds to Step ST11 as a result of such identification, the HDDs 40-1 to 40-6 start reading the pieces of data WS-1 to WS-5 and the parity PT in Step ST11, and thereafter the operation proceeds to Step ST12.

In Step ST12, whether or not a fault has occurred at any one of the HDDs 40-1 to 40-6 is determined. If a fault has occurred at any one of the HDDS, the operation proceeds to Step ST13, and if a fault has occurred at no HDDS, Step ST14 is executed.

In Step ST13, the error correction process is performed using the pieces of data WS and parity read from the faultless HDDs to recover the piece of data to be read from the faulty HDD, and then the operation proceeds to Step ST14.

In Step ST14, the data processing section 33 performs a synthesis process using the read data if the answer is negative in Step ST12 or using the read data and the recovered data if the answer is positive in Step ST12, so that reproduced data DTR is obtained. Further, after supplying the reproduced data DTR to the host computer 10, the operation returns to Step ST1.

When it is determined that a fault has occurred at any one of the HDDS in Step ST12, a recovery process is performed. The recovery process may be performed not only when the fault has been found in Step ST12, but also when a fault has been detected at any time during the periodic monitoring of the operation of each HDD.

Figure 3A:
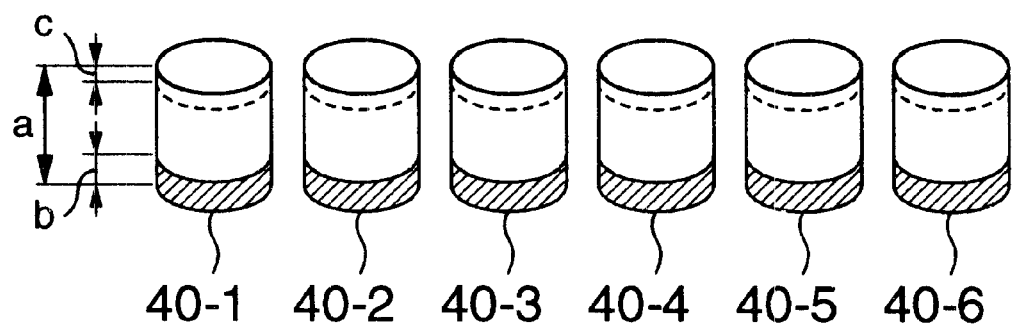
FIGS. 3A and 3B are diagrams for explaining a recovery process in the data recording and reproducing apparatus according to the first embodiment.

Then, the recovery process will be described with reference to FIGS. 3A and 3B. FIG. 3A indicates how the HDDs 40-1 to 40-6 record the pieces of data WS-1 to WS-5 and the parity PT before the occurrence of a fault. In the drawing, the maximum storage capacity of each of the HDDs 40-1 to 40-6 is defined as a capacity "a". The HDDs 40-1 to 40-5 have recorded the pieces of data WS-1 to WS-5, respectively, each piece having a volume "b", and the HDD 40-6 has recorded the parity PT having the volume "b". Each of the HDDs 40-1 to 40-6 has a preset capacity "c" as an area to be used for performing various processes, and records a piece of data WS or a parity PT using the area other than that reserved for the capacity "c".

If a fault is found at one of the HDDs that has stored a piece of data, such piece of data stored in the faulty HDD is recovered and the recovered piece of data is allocated to and recorded in the remaining faultless HDDS. Then, whether or not the preset capacity "c" can be reserved in each of the remaining faultless HDDs is determined. On the other hand, if only a parity is recorded in the faulty HDD, it is determined whether or not the preset capacity "c" can be reserved in each of the remaining faultless HDDs when these faultless HDDS are to record newly allocated pieces of data and a newly generated parity. When it is determined that each of the faultless HDDs has the capacity "c", the faultless HDDs are caused to recover, allocate and record the piece of data recorded in the faulty HDD, or to record newly allocated pieces of data and a newly generated parity as shown in FIG. 3B. As a result, the volume of data of each of the faultless HDDS is increased to "b+d" from "b". Further, when it is determined that the capacity "c" cannot be reserved, the recovery process is brought to an end.

Figure 4:
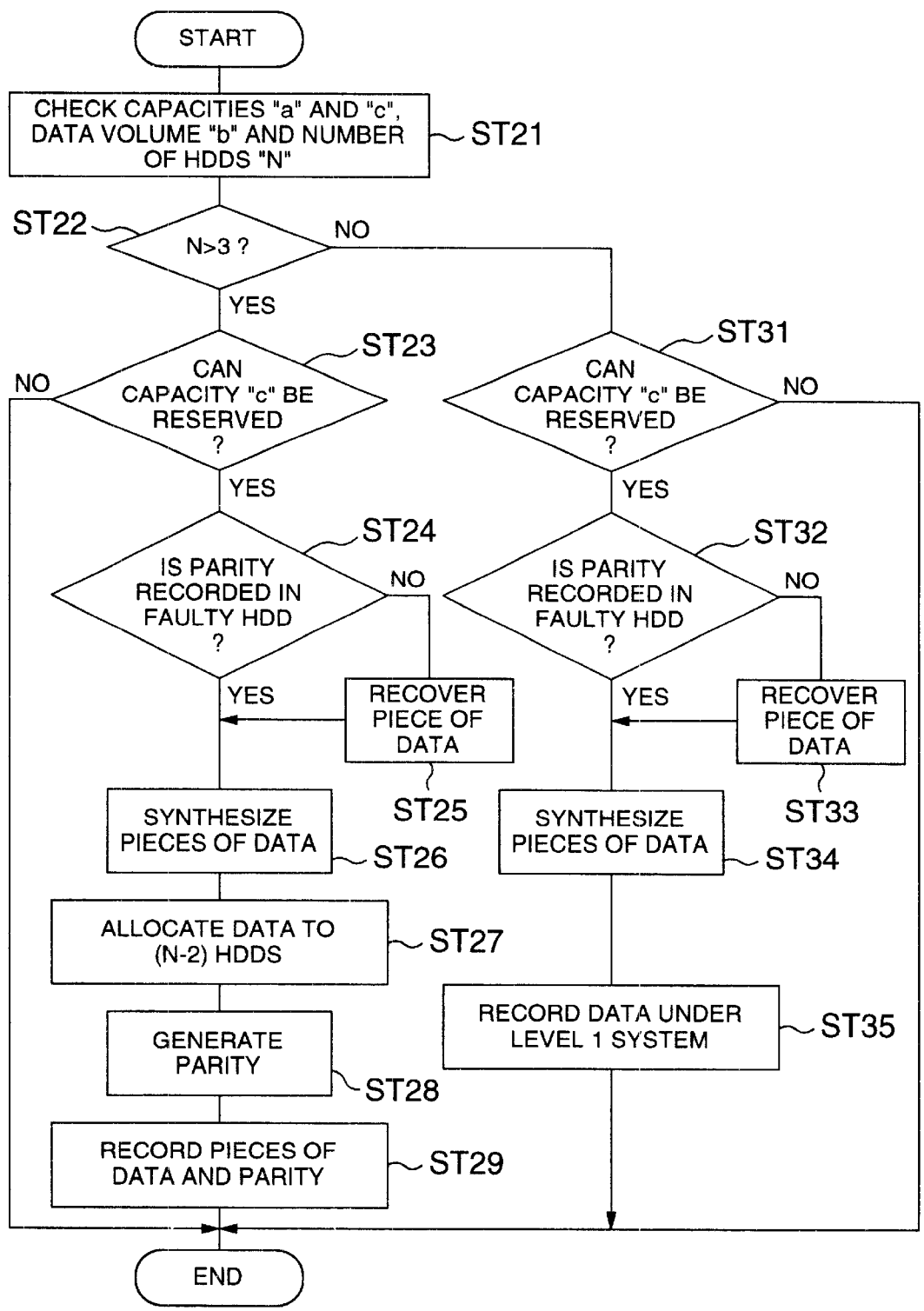
FIG. 4 is a flowchart for explaining the recovery process in the data recording and reproducing apparatus according to the first embodiment.

FIG. 4 is a flowchart showing the recovery process. In this case also, the micom 32a reads a procedure recorded in the memory 32b within the operation control section 32 whenever necessary, and effects control in accordance with the read procedure.

When the recovery process is started after it is determined that a fault has occurred, the maximum capacity "a" of each HDD, the volume "b" of the recorded piece of data or parity, the preset capacity "c" and the number of HDDs "N" are checked in Step ST21, and then the process proceeds to Step ST22.

In Step ST22, whether or not the number of HDDS is greater than three is determined. If the answer is positive, the process proceeds to Step ST23, in which the recovery process is performed under the RAID level 3 system. If the number of HDDs is equal to three, Step ST31 is executed, in which the recovery process is performed. Since the number of faultless HDDs is two, the process is performed using two faultless HDDs under a RAID level 1 system by pairing such two faultless HDDs as mirror images.

In Step ST23, whether or not the preset capacity "c" can be reserved in each of the faultless HDDs when a piece of data or the like recorded in the faulty HDD is to be allocated to and recorded in such faultless HDDs is determined on condition that an equation (1) is satisfied.

$$(a-b-b/(N-1))>c \quad (1)$$

In the equation (1), "N" is the number of HDDs. The number of HDDs in the case shown in FIG. 1 is set to "6." The term (N−1) in the equation (1) is explained as follows. As will be described later, the piece of data recorded in the faulty HDD is allocated to (N−2) faultless HDDs. However, one of the faultless HDDs must store a parity whose volume is almost the same as that of a piece of data stored in a single HDD. Therefore, a total of (N−1) HDDs stores the piece of data or the like.

If it is determined that the equation (1) is satisfied, the process proceeds to Step ST24 and, if not, the recovery process is brought to an end. The user may fully take advantage of the empty areas of the HDDs by advancing the process to Step ST24 on condition that (a−b−b/(N−1))=c is satisfied.

In Step ST24, whether or not the faulty HDD is an HDD having recorded only a parity is determined. If the answer is negative, the process proceeds to Step ST25, and if positive, Step ST26 is executed.

In Step ST25, since the faulty HDD is not an HDD having recorded only a parity, i.e., it is an HDD having recorded a piece of data, the pieces of data and the parity are read from the remaining faultless HDDS, and error correction is made using the read pieces of data and parity to recover the piece of data recorded in the faulty HDD. Then, the process proceeds to Step ST26.

In Step ST26, a synthesis process is performed using the pieces of data read from and recovered by the faultless HDDS. Then, Step ST27 is executed.

In Step ST27, the data obtained by the synthesis process in Step ST26 is subjected to an allocation process again. At this point of the procedure, if a fault is occurring at one HDD that has stored a piece of data, one of the remaining faultless HDDs must record only a parity. Therefore, the allocation process is performed so that the data is allocated to (N−2) HDDS. In the example shown in FIG. 3B, the HDD 40-3 is in fault, and the five HDDS are free from fault. Therefore, the allocation process is performed so that a parity is allocated to one of the faultless HDDs, e.g., the HDD 40-6 and the data to the remaining four HDDs 40-1, 40-2, 40-4 and 40-5. Then, the process proceeds to Step ST28.

Figure 3B:
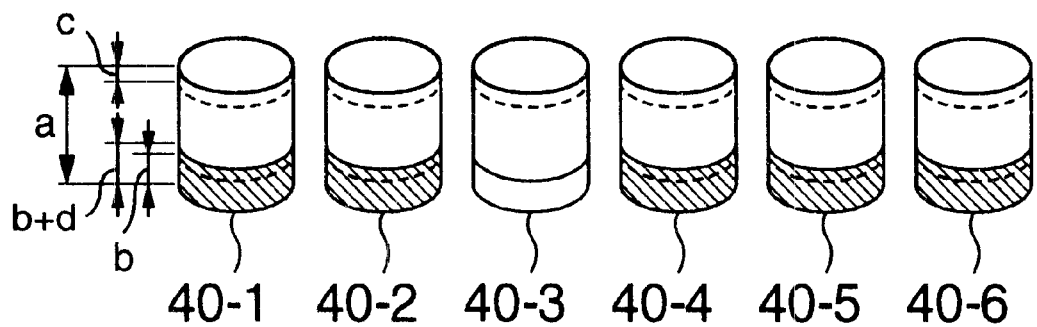

The HDD 40-6 recording the parity has its volume of data increased similarly to the other HDDs recording the piece of data as shown in FIG. 3B.

Further, when one HDD having stored a parity faults, the parity is newly stored in one of the remaining faultless HDDs, and the synthesized data is allocated to the remaining (N−2) faultless HDDs.

In Step ST28, a parity is generated for the allocated pieces of data, and the process proceeds to Step ST29.

In Step ST29, the allocated pieces of data are recorded in the corresponding (N−2) faultless HDDS, respectively, and the generated parity is recorded in the remaining faultless HDD. This step completes the recovery process.

If both the host computer 10 and the disk array unit 20 have sufficient storage capacities to synthesize all pieces of data at once, the recovery process can be complete once Steps ST26 to ST29 are executed. If not, however, the pieces of data are synthesized for such units of data as corresponding to the capacity of the host computer 10 and to the capacity of the disk array unit 20, respectively, in Step ST26, and each piece of the synthesized data is subjected to Steps ST27, ST28 and ST29, and the resultant pieces of data and parity are recorded in (N−2) HDDs. By sequentially repeating Steps ST26 to ST29 for the aforementioned units of data, the recovery process is completed for all the pieces of data.

Further, if it is determined that the number of HDDS is not greater than three in Step ST22 so that the process jumps to Step ST31, it is determined in Step ST31 whether or not the preset capacity "c" can be reserved in each of the faultless HDDS when a piece of data or the like recorded in the faulty HDD is to be allocated to and recorded in the faultless HDDS, on condition that an equation (2) is satisfied, in a manner similar to Step ST23.

$$(a-2b)>c \qquad (2)$$

If it is determined that the equation (2) is satisfied, then the process proceeds to Step ST32. If not, the recovery process is brought to an end. The user may fully take advantage of the empty areas of the HDDs by advancing the process to Step ST32 on condition that (a−2b)=c is satisfied.

In Step ST32, whether or not the faulty HDD is an HDD having recorded a parity is determined. If the answer is negative, the process proceeds to Step ST33, and if positive, Step ST34 is executed.

In Step ST33, since the faulty HDD is not an HDD having recorded a parity, i.e., it is an HDD having recorded a piece of data, the pieces of data and the parity are read from the remaining faultless HDDS, and error correction is made using the read pieces of data and parity to recover the piece of data recorded in the faulty HDD. Then, the process proceeds to Step ST34.

In Step ST34, a synthesis process is performed using the pieces of data read from and recovered by the faultless HDDs. Then, Step ST35 is executed.

In Step ST35, since there are two faultless HDDS, such two HDDs are paired as mirror images, and the data obtained by the synthesis process in Step ST34 is recorded in each of the HDDs. Thus, the recovery process is complete.

Figure 5:
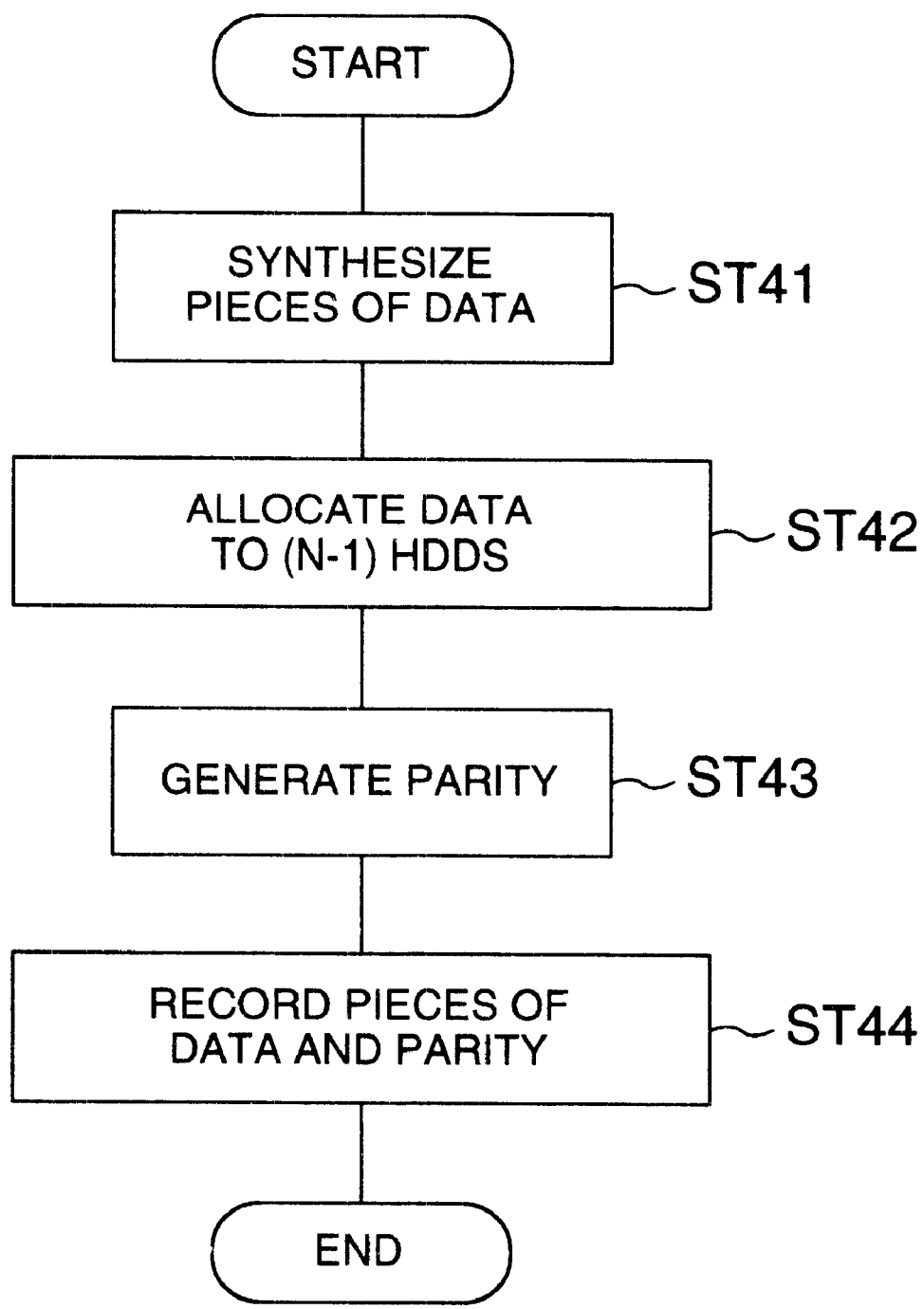
FIG. 5 is a flowchart for explaining a rebuild process in the data recording and reproducing apparatus according to the first embodiment.

When the faulty HDD is thereafter replaced with a new HDD, a rebuild process shown in FIG. 5 is performed. In FIG. 5, the pieces of data are read from the faultless HDDs and subjected to a synthesis process in Step ST41. Then, the process proceeds to Step ST42.

In Step ST42, the data obtained by the synthesis process in Step ST41 is subjected to an allocation process again. During the allocation process, since the faulty HDD is replaced with a new HDD and one of the faultless HDDs must record a parity, the data is allocated to (N−1) HDDs in this process. Then, the process proceeds to Step ST43.

In Step ST43, a parity is generated for the allocated pieces of data, and then the process proceeds to Step ST44.

In Step ST44, the allocated pieces of data are recorded in (N−1) HDDs and the parity is recorded in the remaining one HDD. Thus, the rebuild process is complete.

According to the aforementioned embodiment, even if a fault occurs at an HDD, a piece of data recorded in such faulty HDD is recovered, allocated to and recorded in other faultless HDDs. Therefore, even if a fault occurs in another HDD before the completion of a rebuild process, a piece of data recorded in such newly faulting HDD can be recovered, so that correct, reproduced data can be obtained. Further, when the faulty HDD is replaced with a new HDD, a rebuild process is performed to permit efficient use of HDDS.

While the disk array unit 20 has been described as being of a RAID level 3 system in the aforementioned embodiment, a level 4 or 5 unit 20 similarly allows a piece of data recorded in a faulty HDD to be allocated to and recorded in faultless HDDS, so that reliability can be improved.

That is, in a RAID level 4 system, a parity is similarly recorded in a prescribed HDD as in the level 3 system, so that a recovery process is similarly performed in accordance with FIG. 4 as in the level 3 system.

On the other hand, in a RAID level 5 system, the recovery process shown in FIG. 4 is modified as follows. That is, in the RAID level 5 system, both a piece of data and a parity are allocated to each HDD, i.e., each HDD records a set consisting of a piece of data and a parity. Therefore, if it is determined positively in Step ST23, then Step ST25 is executed by determining negatively in Step ST24, and Steps ST26 and 27 are thereafter executed. In Step ST27, the synthesized data is allocated to (N−1) HDDs excluding the faulty HDD, and after parities have been generated in Step ST28, both one of the allocated pieces of data and one of the parities are recorded in each of (N−1) HDDs in Step ST29.

Further, in the aforementioned embodiment, the case where the volume of a parity PT equals that of a piece of data recorded in each HDD has been described. Even if these volumes are different, similar processes can be performed by modifying the equations (1) and (2) accordingly.

According to this embodiment, when a fault occurs at any one of a plurality of recording and reproducing means and a piece of second data recorded in such faulty recording and reproducing means cannot be read, first data can be reproduced using pieces of second data recorded in faultless recording and reproducing means. Thereafter, the reproduced first data is divided in accordance with the faultless recording and reproducing means, and an error correction code is generated for the divided pieces of data to produce new pieces of second data, and such new pieces of second data are allocated to and recorded in the faultless recording and reproducing means.

As a result, even if a fault occurs again in a recording and reproducing means, the first data is reproduced using the new pieces of second data that are recorded in the faultless recording and reproducing means. Hence, reliability can be improved without increasing costs.

Further, when the pieces of second data are produced by dividing the first data, an error correction code is added to such pieces of second data. Therefore, the first data can be reproduced easily using the pieces of second data recorded in faultless recording and reproducing means.

Still further, since new pieces of second data are recorded in the faultless recording and reproducing means after it is confirmed that such recording and reproducing means can record the new pieces of second data. Therefore, recording and reproducing means can be used efficiently to assure their reliable operation.

Next, a data recording and reproducing apparatus having an auxiliary recording and reproducing unit (HDD), which is a second embodiment of the present invention, will be described.

In this embodiment, parts and components having similar functions to those of the first embodiment are denoted by the same reference numerals and their description will be omitted to avoid repetition.

In this embodiment, a disk array unit 20 includes an array controller 30, a plurality of HDDS, e.g., seven HDDs 40-1 to 40-7, and an auxiliary HDD 40-8. A write control signal CW from an operation control section 32 is supplied to a data processing section 33 and write/read control sections 34-1 to 34-8.

If it is supposed that the disk array unit 20 is of a RAID level 3 system and is to allocate and write recording data to the HDDs 40-1 to 40-6 and to write a parity PT to the HDD 40-7, then pieces of data WS-1 to WS-6 obtained by allocating the writing data are supplied to the write/read control sections 34-1 to 34-6 corresponding to the HDDS 40-1 to 40-6. Further, the generated parity PT is supplied to the write/read control section 34-7 corresponding to the HDD 40-7. In case of using the auxiliary HDD 40-8, a piece of data or a parity to be recorded in this HDD 40-8 is supplied to the write/read control section 34-8.

The write/read control section 34-1 performs a write process by which the piece of data WS-1 supplied from the data processing section 33 is written sequentially from the position specified by command data MD under the control of the HDD 40-1 by the write control signal CW. Further, the write/read control sections 34-2 to 34-7 similarly write the pieces of data WS-2 to WS-6 and the parity PT to the HDDS 40-2 to 40-7 sequentially based on the write control signal CW. The write/read control section 34-8 performs a process for writing a supplied piece of data or parity under the control of the HDD 40-8 based on the write control signal CW.

Further, when command data ND for reading data recorded in the disk array 20 is supplied from a host computer 10, the operation control section 32 supplies a read control signal CR to the write/read control sections 34-1 to 34-8 based on the command data ND.

The write/read control sections 34-1 to 34-7 control the HDDs 40-1 to 40-7 based on the read control signal CR, so that the recorded pieces of data WS-1 to WS-6 and parity PT are sequentially read from the positions specified by the command data ND. The read pieces of data WS-1 to WS-6 and parity PT are supplied to the data processing section 33. In case of using the auxiliary HDD 40-8, the piece of data or parity recorded in the HDD 40-8 is read by the write/read control section 34-8 based on the read control signal CR and the read piece of data or parity is supplied to the data processing section 33.

The data processing section 33 performs an error correction process to which the read pieces of data WS-1 to WS-6 are subjected using the read parity PT. The error-corrected pieces of data WS-1 to WS-6 are subjected to a synthesis process so that they are recovered to what they were before an allocation process, and the resultant data is supplied to the host computer 10 as reproduced data DTR through the data control section 31.

When any one of the HDDs 40-1 to 40-7 generates a signal indicating occurrence of a fault and supplies it to the operation control section 32, the section 32 determines which HDD is in fault. Further, the write/read control sections 34-1 to 34-7 also detect a fault occurring at any one of the HDDs 40-1 to 40-7 during their data writing or reading operations, and supply a signal indicating the detected result to the operation control section 32 so that the section 32 can determine which HDD is in fault. In the latter case, the write/read control sections 34-1 to 34-7 may detect occurrence of a fault not only during their data writing or reading operations, but, e.g., periodically at a predetermined time interval as well.

Then, an operation of the disk array unit 20 will be described. In the following operation, a microcomputer 32a reads a procedure of a program recorded in a memory 32b within the operation control section 32 whenever necessary, and control is effected in accordance with the read procedure. For simplicity of explanation, the volume of data of a parity PT equals that of each of pieces of data WS-1 to WS-7. Similarly to the first embodiment shown in FIG. 1, this program may be stored in the memory 32b after read by a recording-medium reader from a computer-readable recording medium, or may be downloaded through a network.

Figure 7:
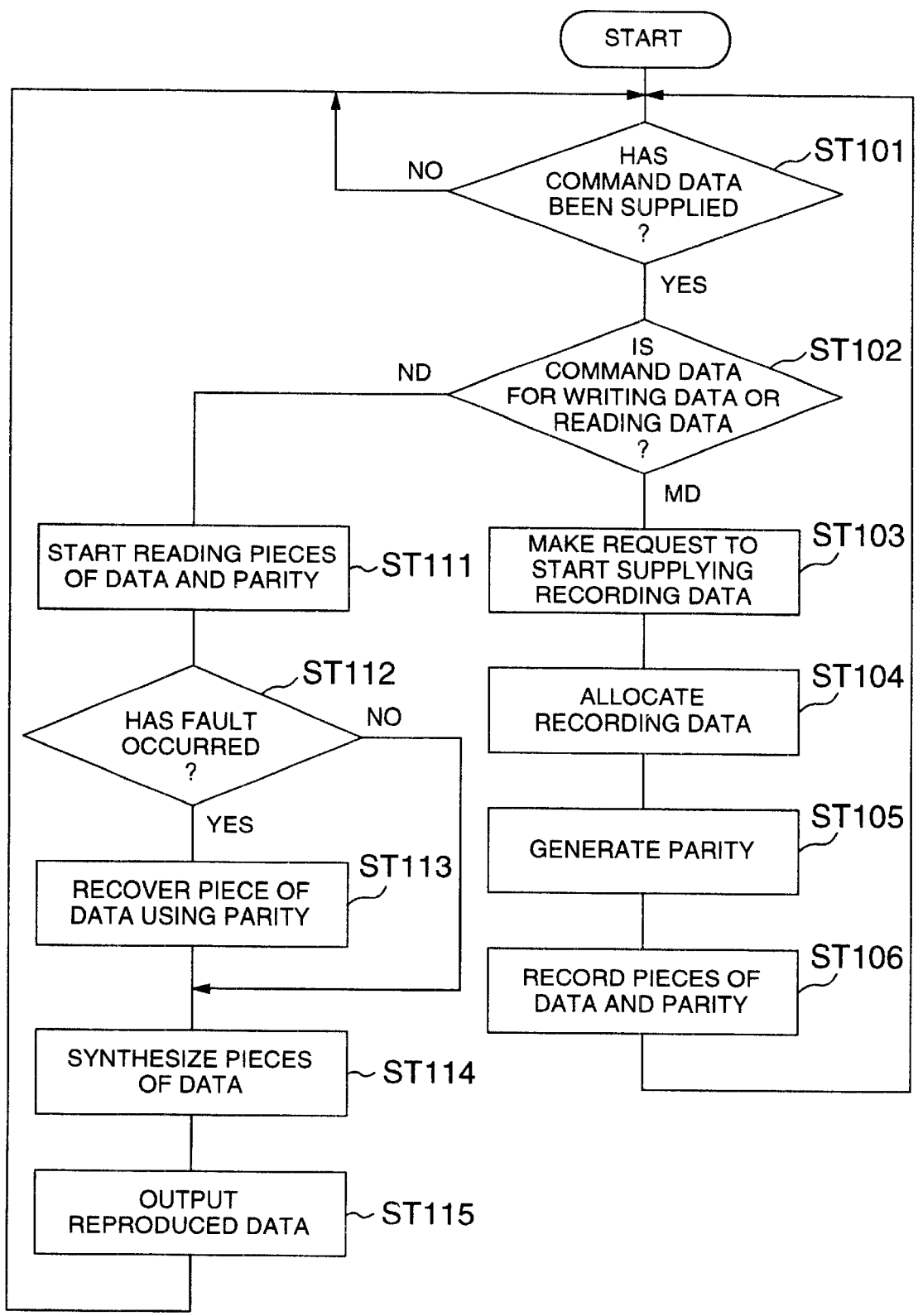
FIG. 7 is a flowchart for explaining an operation of the data recording and reproducing apparatus according to the second embodiment.

In a flowchart shown in FIG. 7, in Step ST101, whether or not the host computer 10 has supplied command data is determined. If the answer is negative, Step ST101 is repeated, and if positive, Step ST102 is executed.

In Step ST102, the type of the command data is identified. If the command data is command data MD for recording data in the disk array unit 20, the operation proceeds to Step ST103. If it is the command data ND for reading the data recorded in the disk array unit 20, the operation jumps to Step ST111.

In Step ST103, the operation control section 32 of the disk array unit 20 requests the host computer 10 to start supplying recording data DTW, and then the operation proceeds to Step ST104.

In Step ST104, the data processing section 33 subjects the recording data DTW supplied from the host computer 10 to an allocation process. Since the disk array unit 20 is of the RAID level 3 system and six HDDs are used to record a piece of data as described above, the recording data DTW is divided into pieces of data WS-1 to SW-6 by the allocation process.

In the next Step ST105, the data processing section 33 generates a parity PT based on the pieces of data WS-1 to WS-6, and then the operation proceeds to Step ST106.

In Step ST106, the HDDs 40-1 to 40-7 record the pieces of data WS-1 to WS-6 and the parity PT, respectively, and then the operation returns to Step ST101.

When the command data supplied from the host computer 10 is identified as the command data ND for reading the recorded data in Step ST102 and the operation proceeds to Step ST111 as a result of such identification, the HDDs 40-1 to 40-7 start reading the pieces of data WS-1 to WS-6 and the parity PT in Step ST111, and thereafter the operation proceeds to Step ST112.

In Step ST112, whether or not a fault has occurred at the HDDs 40-1 to 40-7 is determined. If it is determined that a fault has occurred, the operation proceeds to Step ST113, and if not, Step ST114 is executed.

In Step ST113, an error correction process is performed using pieces of data WS and a parity read from faultless HDDs to recover a piece of data to be read from a faulty HDD, and then the operation proceeds to Step ST114.

In Step ST114, the data processing section 33 performs a synthesis process using the read pieces of data or using the read pieces of data and the recovered piece of data, so that reproduced data DTR is obtained. Further, after supplying the reproduced data DTR to the host computer 10, the operation returns to Step ST101.

When it is determined that a fault has occurred in Step ST112, recovery processes are performed. The recovery processes may be performed not only when the fault has been found in Step ST112, but also when a fault is detected at any time during the periodic monitoring of the operation of each HDD.

Figure 8A:
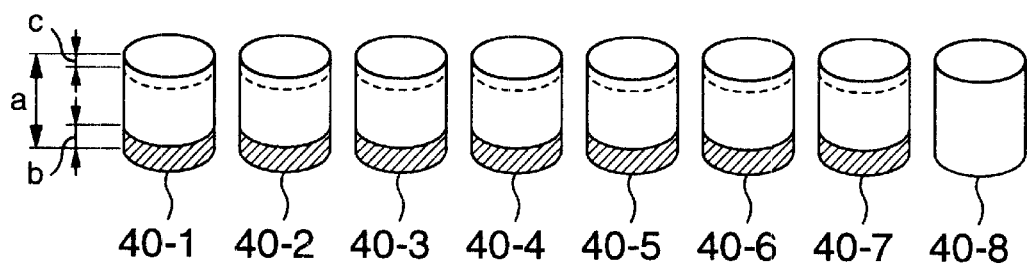
FIGS. 8A to 8D are diagrams for explaining a first recovery process in the data recording and reproducing apparatus according to the second embodiment.

Then, a first recovery process will be described with reference to FIGS. 8A to 8D. FIG. 8A indicates how the HDDS 40-1 to 40-8 record the pieces of data WS-1 to WS-6 and the parity PT before the occurrence of a fault. In the drawing, the maximum storage capacity of each of the HDDs 40-1 to 40-8 is defined as a capacity "a". The HDDs 40-1 to 40-6 have recorded the pieces of data WS-1 to WS-6, respectively, each piece of data having a volume "b", and the HDD 40-7 has recorded the parity PT having the volume "b". The HDD 40-8, which is an auxiliary HDD, records no data or parity. Each HDD 40 has a preset capacity "c" as an area to be used for performing various processes, and records a piece of data WS or a parity PT using the area other than that reserved for the capacity "c".

Figure 8B:
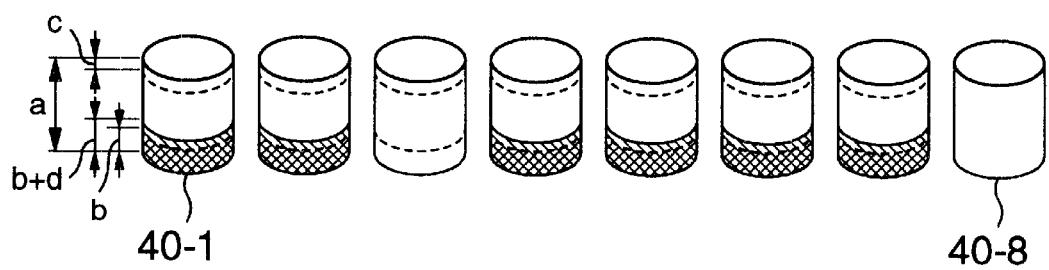

If a fault is found at one of the HDDS, e.g., the HDD 40-3, and when a piece of data or parity recorded in the faulty HDD 40-3 cannot be read, the piece of data recorded in the faulty HDD 40-3 is recovered using the pieces of data and parity recorded in the faultless HDDS or a parity is generated from the pieces of data recorded in the faultless HDDS. Then, it is determined whether or not the preset capacity "c" can be reserved in each of the faultless HDDs excluding the auxiliary HDD when the recovered piece of data or the generated parity is to be allocated to and recorded in the faultless HDDS excluding the auxiliary HDD. If it is determined that each of the faultless HDDs has the capacity "c", the piece of data or the parity is allocated to and recorded in the faultless HDDS, and as a result, the volume of data in each of the faultless HDDs is increased to "b+d" from "b" as shown in FIG. 8B.

Figure 8C:
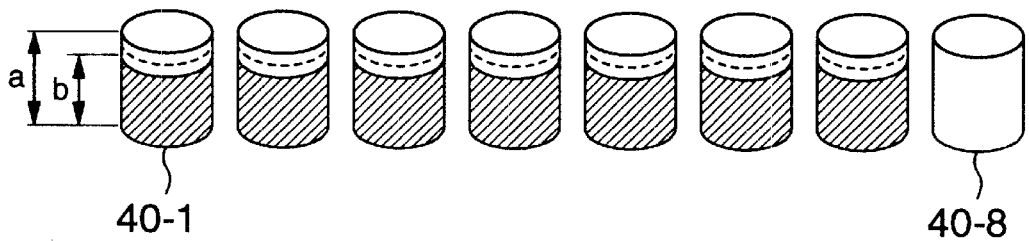
Figure 8D:
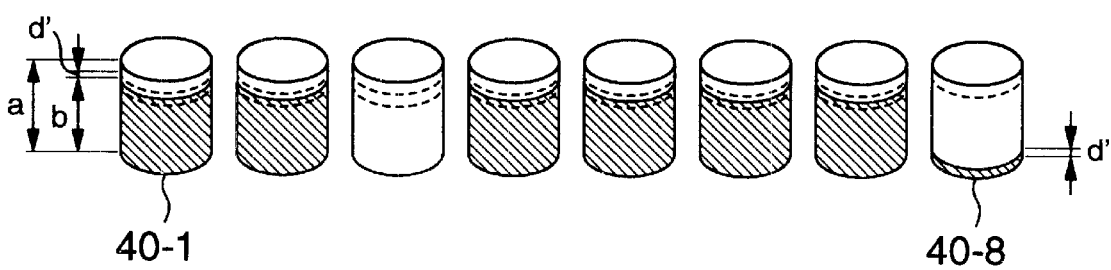

Further, when it is determined that the capacity "c" cannot be reserved due to the volume of data or parity recorded being so large as shown in FIG. 8C, it is determined whether or not the capacity "c" can be reserved in each of the faultless HDDs when the recovered piece of data or the generated parity is to be allocated to and recorded in the faultless HDDs including the auxiliary HDD. If it is determined that each of the faultless HDDs has the capacity "c", the recovered piece of data or the generated parity is allocated to and recorded in the faultless HDDs and the auxiliary HDD, and as a result, the volume of data in each of the faultless HDDs is increased to "b+d'" from "b" and the volume of data of the auxiliary HDD becomes "d'" as shown in FIG. 8D. If the capacity "c" cannot be reserved, the recovery process is brought to an end.

Figure 9:
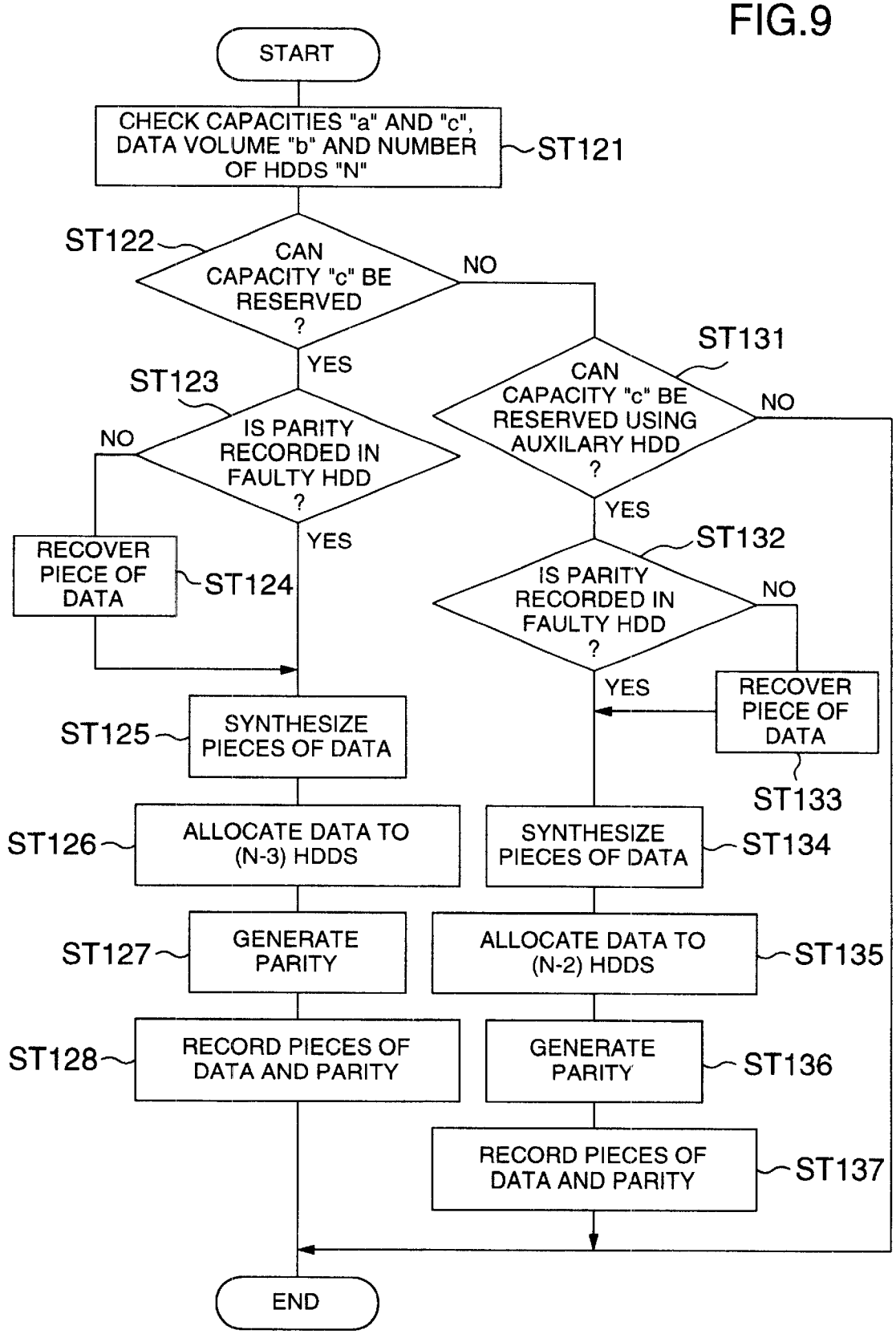
FIG. 9 is a flowchart for explaining the first recovery process in the data recording and reproducing apparatus according to the second embodiment.

FIG. 9 is a flowchart showing the first recovery process. When the first recovery process is started after a fault has been found, the maximum capacity "a" of each HDD, the volume "b" of the recorded data or parity, the preset capacity "c" and the number of HDDs "N" are checked in Step ST121, and then the process proceeds to Step ST122.

In Step ST122, whether or not the preset capacity "c" can be reserved in each of the faultless HDDs when a piece of data or a parity recorded in the faulty HDD is to be, e.g., allocated to and recorded in such faultless HDDs is determined, on condition that an equation (3) is satisfied.

$$(a-b-b/(N-2))>c \qquad (3)$$

Figure 6:
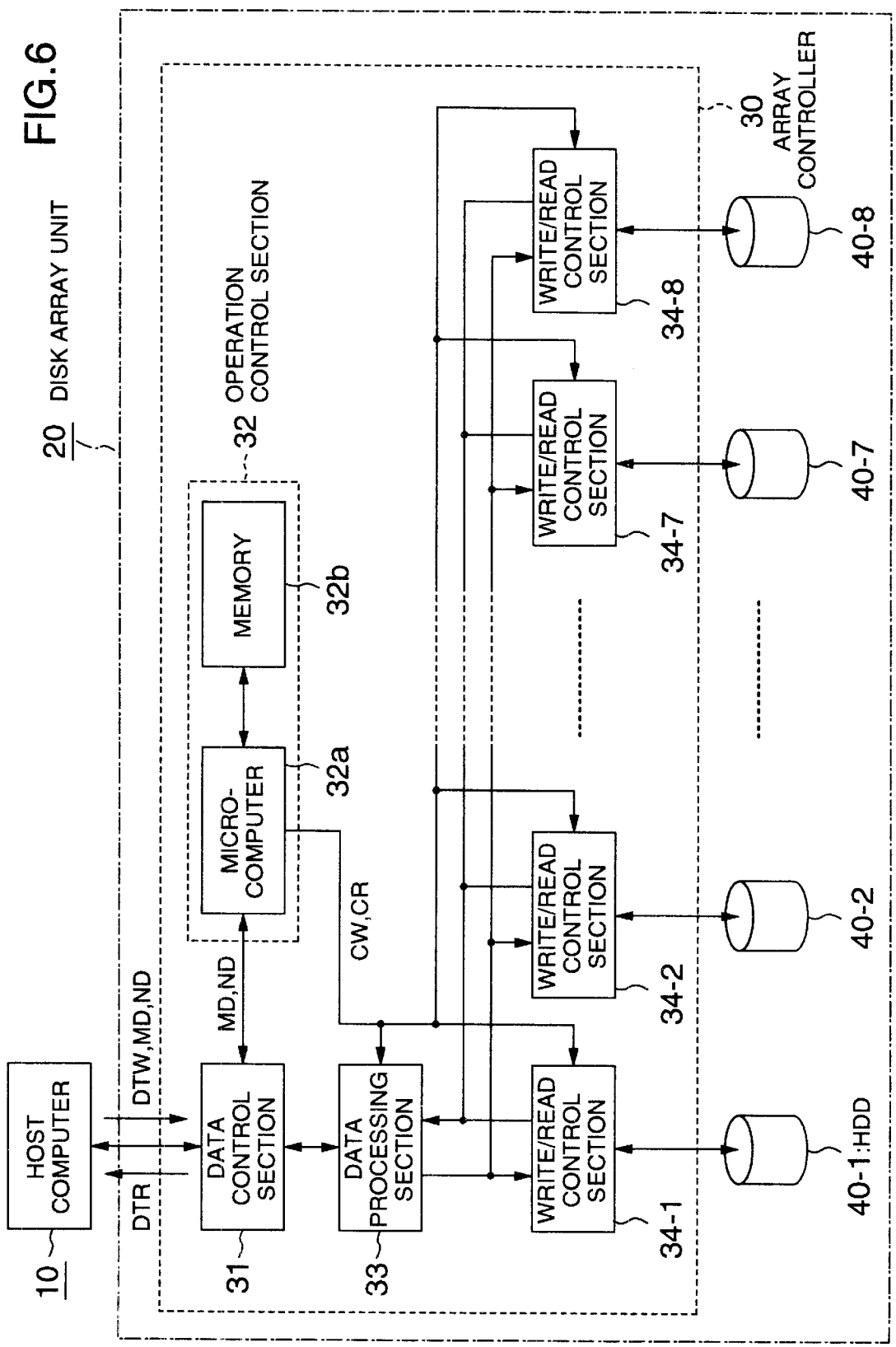
FIG. 6 is a block diagram showing an exemplary construction of a data recording and reproducing apparatus, which is a second embodiment of the present invention.

In the equation (3), "N" is the number of HDDS. The number of HDDs in the case shown in FIG. 6 is set to "8." The term (N−2) in the equation (3) is explained as follows. A piece of data in the faulty HDD is allocated to (N−3) faultless HDDs. However, one of the faultless HDDs must store a parity whose volume is almost the same as that of a piece of data stored in a single HDD. Therefore, a total of (N−2) HDDs stores the data or the like.

If it is determined that the equation (3) is satisfied, the process proceeds to Step ST123 and, if not, Step ST131 is executed. The user may fully take advantage of the empty areas of the HDDs by advancing the process to Step ST123 on condition that (a−b−b/(N−2))=c is satisfied.

In Step ST123, whether or not the faulty HDD is an HDD having recorded a parity is determined. If the answer is negative, the process proceeds to Step ST124, and if positive, Step ST125 is executed.

In Step ST124, since the faulty HDD is not an HDD having recorded a parity, i.e., it is an HDD having recorded a piece of data, the pieces of data and the parity are read from the faultless HDDs, and the piece of data recorded in the faulty HDD is recovered using the read pieces of data and parity. Then, the process proceeds to Step ST125.

In Step ST125, a synthesis process is performed using the pieces of data read from and recovered by the faultless HDDS. Then, Step ST126 is executed.

In Step ST126, the data obtained by the synthesis process in Step ST125 is subjected to an allocation process again. At this point of the process, a fault is occurring at one HDD, and one faultless HDD must record a parity and there is one auxiliary HDD. Therefore, the allocation process is performed so that the data is allocated to (N−3) HDDS. In the example shown in FIGS. 8B to 8D, seven HDDs are free from fault. Therefore, a parity is recorded in one faultless HDD, and the data is allocated to the five faultless HDDS. Then, the process proceeds to Step ST127.

In Step ST127, a parity is generated for the allocated pieces of data, and the process proceeds to Step ST128.

In Step ST128, the allocated pieces of data and the parity are recorded in the faultless HDDS, and thus the recovery process is complete.

Further, if it is determined that the equation (3) is not satisfied in Step ST122 so that the process jumps to Step ST131, it is determined in Step ST131 whether or not the preset capacity "c" can be reserved in each of the faultless HDDs and the auxiliary HDD when the piece of data or the like recorded in the faulty HDD is to be allocated to and recorded in the faultless HDDs and the auxiliary HDD, on condition that an equation (4) is satisfied.

$$(a-b-b)/(N-1))>c \qquad (4)$$

If it is determined that the equation (4) is satisfied, the process proceeds to Step ST132. If not, the recovery process is brought to an end. The user may fully take advantage of the empty areas of the HDDs by advancing the process to Step ST132 on condition that (a−b−b/(N−1))=c is satisfied. The same reason for the term (N−1) in the equation (1) applies to the term (N−1) in the equation (4).

In Step ST132, whether or not the faulty HDD is an HDD having recorded a parity is determined. If the answer is negative, the process proceeds to Step ST133, and if positive, Step ST134 is executed.

In Step ST133, since the faulty HDD is not an HDD having recorded a parity, i.e., it is an HDD having recorded a piece of data, the pieces of data and the parity are read from the remaining faultless HDDs, and error correction is made using the read pieces of data and parity to recover the piece of data recorded in the faulty HDD. Then, the process proceeds to Step ST134.

In Step ST134, a synthesis process is performed using the pieces of data read from and recovered by the faultless HDDs. Then, Step ST135 is executed.

In Step ST135, the data obtained by the synthesis process in Step ST134 is subjected to an allocation process again. At this point of the process, a fault is occurring at one HDD and one faultless HDD must record a parity at this point of process. Therefore, the allocation process is performed so that the data is allocated to (N−2) HDDS. In the example shown in FIGS. 8B to 8D, seven HDDs are free from fault. Therefore, a parity is recorded in one faultless HDD, and the data is allocated to the six faultless HDDS. Then, the process proceeds to Step ST136.

In Step ST136, a parity is generated for the allocated pieces of data, and the process proceeds to Step ST137.

In Step ST137, the allocated pieces of data and the parity are recorded in the faultless HDDs and the auxiliary HDD, and thus the recovery process is complete.

Figure 10:
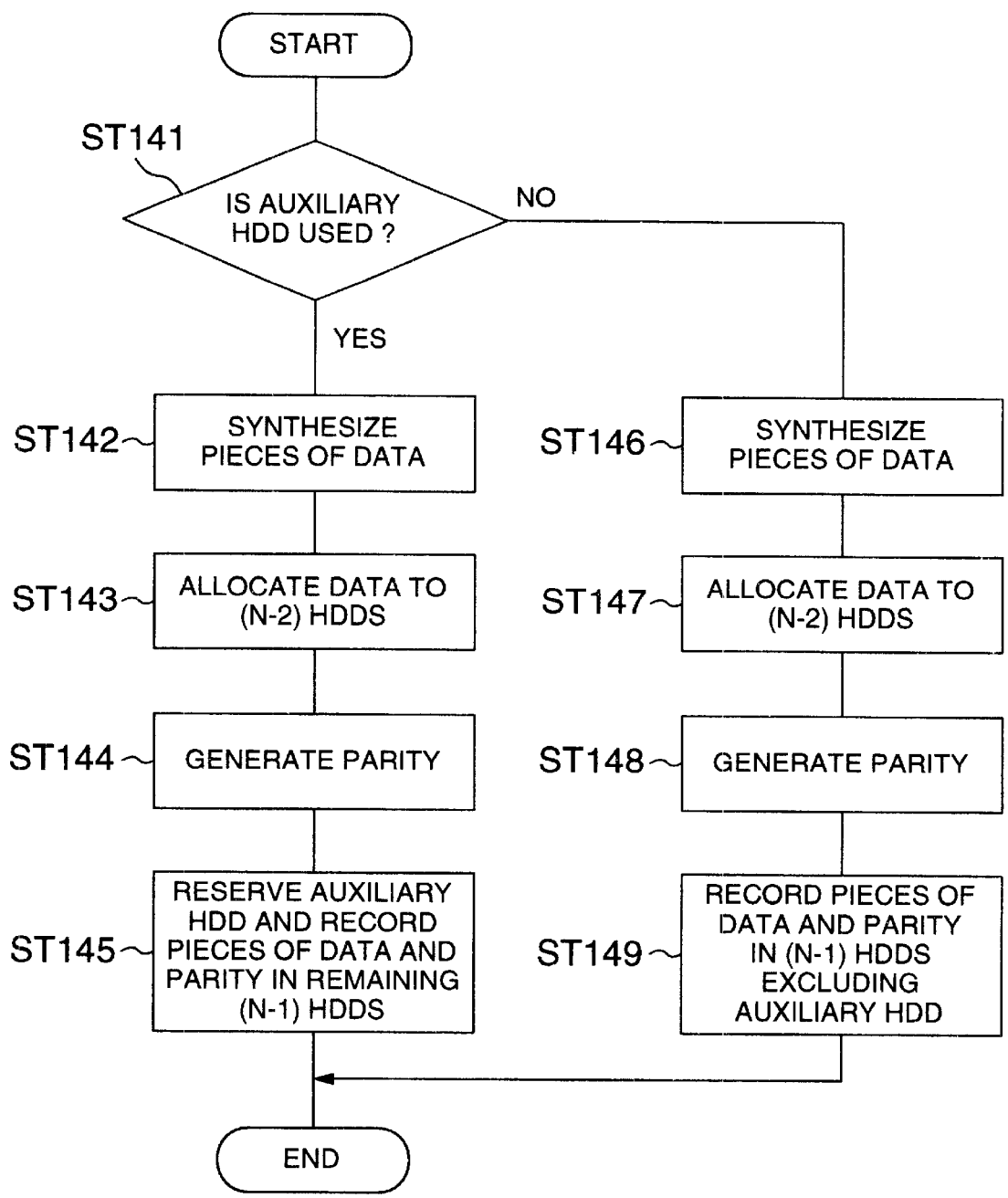
FIG. 10 is a flowchart for explaining a rebuild process in the data recording and reproducing apparatus according to the second embodiment.

When the faulty HDD is thereafter replaced with a new HDD, a rebuild process shown in FIG. 10 is performed. In FIG. 10, whether or not the auxiliary HDD is in use is determined in Step ST141. If the answer is positive, the process proceeds to Step ST142, and if negative, Step ST146 is executed.

In Step ST142, the pieces of data and the parity are read from the faultless HDDS and the auxiliary HDD and the read pieces of data and parity are subjected to a synthesis process. Then, the process proceeds to Step ST143.

In Step ST143, the data obtained by the synthesis process in Step ST142 is subjected to an allocation process again. At this point of the process, the faulty HDD is replaced with a new HDD and one faultless HDD must record a parity. Further, the auxiliary HDD is provided. Therefore, the data is allocated to (N−2) HDDs in the allocation process. Then, the process proceeds to Step ST144.

In Step ST144, a parity is generated for the allocated pieces of data, and then the process proceeds to Step ST145.

In Step ST145, the auxiliary HDD is reserved for use, and the allocated pieces of data and the parity are recorded in the other faultless HDDs and the replaced HDD. Thus, the rebuild process is complete.

Further, if it is determined that the auxiliary HDD is not in use in Step ST141 so that the process proceeds to Step ST146, the pieces of data and the parity are read from the faultless HDDs and the read pieces of data and parity are subjected to a synthesis process. Then, the process proceeds to Step ST147.

In Step ST147, the data obtained by the synthesis process in Step ST146 is subjected to an allocation process again. At this point of the process, the faulty HDD is replaced with a new HDD and one faultless HDD must record a parity. Further, an HDD is reserved as an auxiliary one. Therefore, the data is allocated to (N−2) HDDs in the allocation process. Then, the process proceeds to Step ST148.

In Step ST148, a parity is generated for the allocated pieces of data, and then the process proceeds to Step ST149.

In Step ST149, the allocated pieces of data and the parity are recorded in the faultless HDDs and the replaced HDD excluding the auxiliary HDD. Thus, the rebuild process is complete.

According to the first recovery process, even if a fault occurs at an HDD, a piece of data recorded in such faulty HDD is recovered, allocated to and recorded in other faultless HDDS. Therefore, even if a fault occurs at another HDD before the completion of a rebuild process, data recorded in such newly faulting HDD can be recovered, so that correct, reproduced data can be obtained. Further, if the volume of data or parity recorded in the HDD is large, such data or parity is allocated also to the auxiliary HDD. Therefore, the recovery process can be performed efficiently while reserving an auxiliary HDD.

The recovery process can be performed more efficiently if a larger volume of data or parity can be recorded in the auxiliary HDD than other HDDs.

Figure 11A:
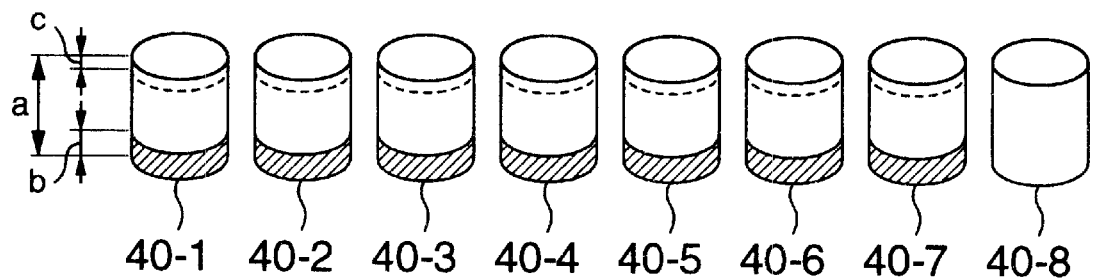
FIGS. 11A to 11C are diagrams for explaining a second recovery process in the data recording and reproducing apparatus according to the second embodiment.

Then, a second recovery process will be described with reference to FIGS. 11A to 11C. FIG. 11A indicates, similarly to FIG. 8A, how the HDDs 40-1 to 40-8 record pieces of data WS-1 to WS-6 and a parity PT before the ccurrence of a fault. In the drawing, the maximum storage capacity of each of the HDDs 40-1 to 40-8 is defined as a capacity "a". The HDDs 40-1 to 40-6 have recorded the pieces of data WS-1 to WS-6, respectively, each piece of data having a volume "b", and the HDD 40-7 has the parity PT having the volume "b". The HDD 40-8, which is an auxiliary HDD, records no data or parity. Each HDD 40 has a preset capacity "c" as an area to be used for performing various processes, and records a piece of data WS or a parity PT using the area other than that reserved for the capacity "c".

Figure 11B:
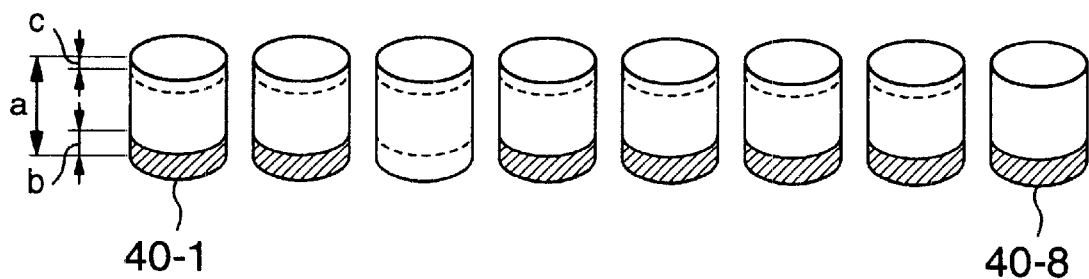
Figure 11C:
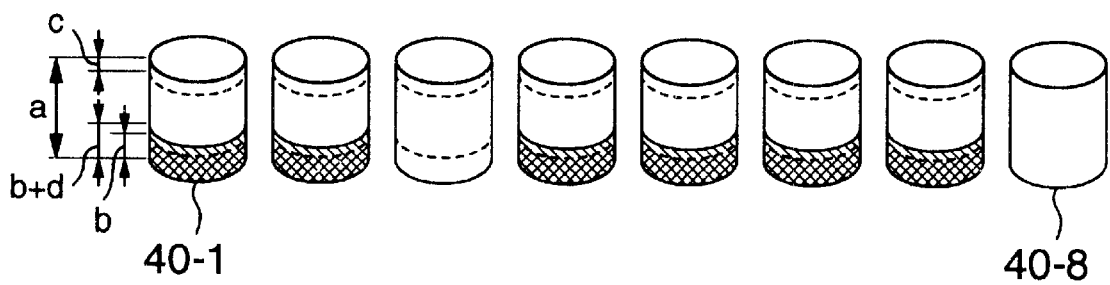

If a fault is found at one of the HDDS, e.g., the HDD 40-3, and when a piece of data or parity cannot be read, the piece of data recorded in the faulty HDD 40-3 is recovered using the pieces of data and parity recorded in the faultless HDDS, or a parity is generated from the pieces of data recorded in the faultless HDDS, so that the recovered piece of data or the generated parity is recorded in the auxiliary HDD 40-8 as shown in FIG 11B.

It is determined thereafter whether or not the preset capacity "c" can be reserved in each of the faultless HDDs when the piece of data recorded in the auxiliary HDD is to be allocated to and recorded in the faultless HDDs or when, if the parity is recorded in the auxiliary HDD 40-8, the pieces of data recorded in the faultless HDDs and a newly generated parity are to be allocated to and recorded in the faultless HDDS. If it is determined that each of the faultless HDDs has the capacity "c", the piece f data recorded in the auxiliary HDD is allocated to and recorded in the faultless HDDS, or the pieces of data and the newly generated parity are allocated to and recorded in the faultless HDDS, and as a result, the volume of data in each of the faultless HDDs is increased to "b+d" dog from "b" as shown in FIG. 1C, with the HDD 40-8 being reserved as an auxiliary one.

FIG. 12 is a flowchart showing the second recovery process. In this case also, the microcomputer 32a reads a procedure of the program recorded in the memory 32b within the operation control section 32 whenever necessary, and control is effected in accordance with the read procedure. For simplicity of explanation, the volume of data of a parity PT equals that of each of pieces of data WS-1 to WS-6.

When the recovery process is started after a fault has been found, whether or not a parity has been recorded in the faulty HDD is determined in Step ST151. If the answer is negative, the process proceeds to Step ST152, and if positive, Step ST153 is executed.

In Step ST152, since the faulty HDD is not an HDD having recorded a parity, i.e., it is an HDD having recorded a piece of data, the pieces of data and the parity are read from the faultless HDDS, and the piece of data recorded in the faulty HDD is recovered using the read pieces of data and parity. Then, the process proceeds to Step ST153.

In Step ST153, the recovered piece of data or the generated parity is recorded in the auxiliary HDD.

Then, the maximum capacity "a" of each HDD, the volume "b" of the recorded data or parity, the preset capacity "c" and the number of HDDs "N" are checked in Step ST154, and then the process proceeds to Step ST155.

In Step ST155, whether or not the preset capacity "c" can be reserved in each of the faultless HDDs when the piece of data recorded in the auxiliary HDD is to be allocated to and recorded in such faultless HDDs is determined, on condition that an equation (5) is satisfied.

$$(a-b-b/(N-2))>c \qquad (5)$$

In the equation (5), "N" is the number of HDDS. The same reason for the term (N−2) in the equation (3) applies to the term (N−2) in the equation (5).

If it is determined that the equation (5) is satisfied, the process proceeds to Step ST156 and, if not, the recovery process is brought to an end. The user may fully take advantage of the empty areas of the HDDs by advancing the process to Step ST156 on condition that (a−b−b/(N−2))=c is satisfied.

In Step ST156, the pieces of data and the parity are read from the faultless HDDs and the auxiliary HDD, and a synthesis process is performed using the read pieces of data and parity. Then, Step ST157 is executed.

In Step ST157, the data obtained by the synthesis process in Step ST156 is subjected to an allocation process again. At this point of the process, a fault is occurring at one HDD, and one faultless HDD must record a parity and there is one auxiliary HDD. Therefore, the allocation process is performed so that the data is allocated to (N−3) HDDS. In the example shown in FIGS. 11B and 11C, seven HDDs are free from fault. Thus, one HDD is used as the auxiliary HDD, and the other one for recording a parity, so that the data is allocated to the remaining five faultless HDDS. Then, the process proceeds to Step ST158.

In Step ST158, a parity is generated for the allocated pieces of data, and the process proceeds to Step ST159.

In Step ST159, the allocated pieces of data and the parity are recorded in the faultless HDDS, and thus the recovery process is complete.

Figure 13:
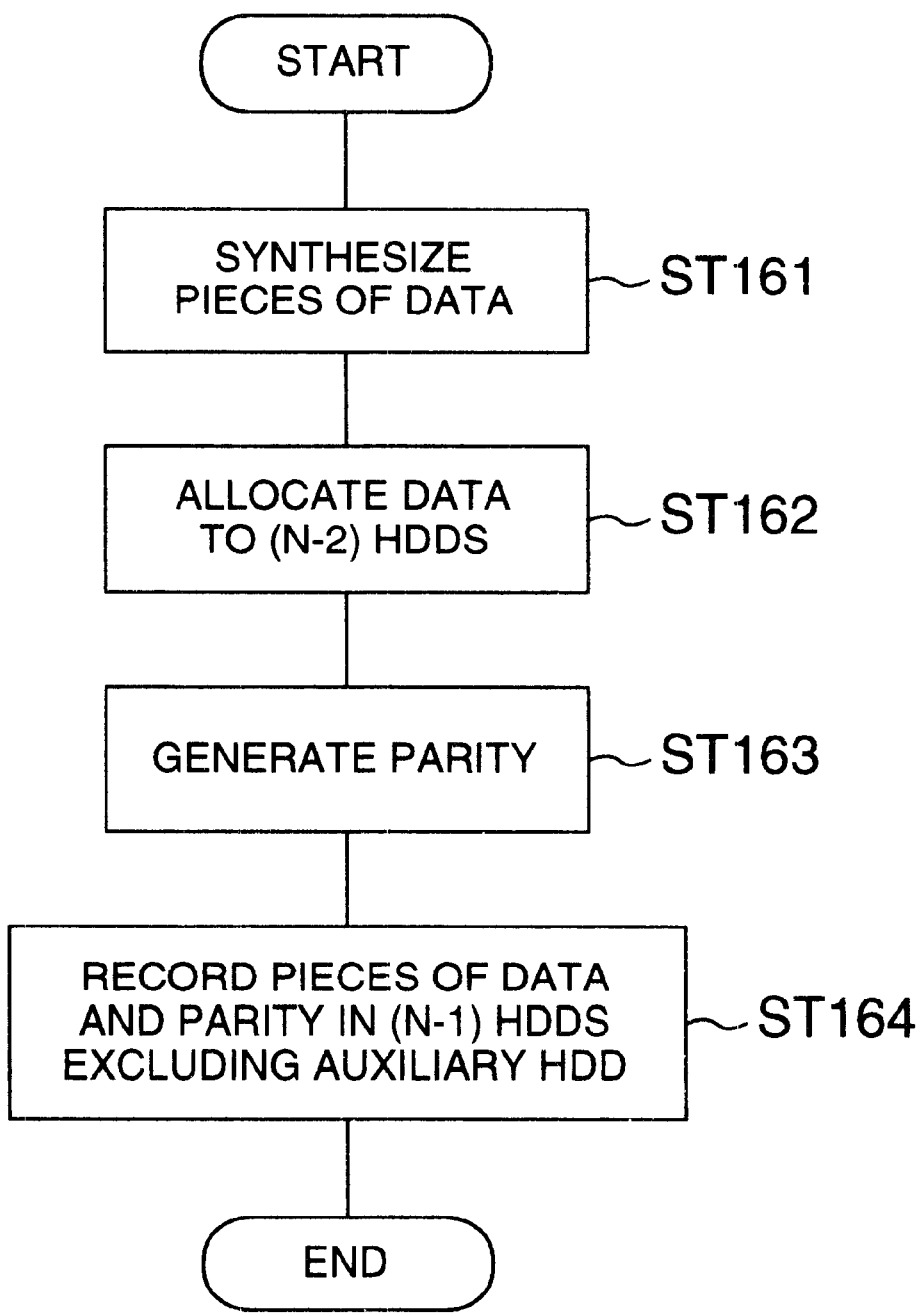
FIG. 13 is a flowchart for explaining a rebuild process in the data recording and reproducing apparatus according to the second embodiment.

When the faulty HDD is thereafter replaced with a new HDD, a rebuild process shown in FIG. 13 is performed. In FIG. 13, the pieces of data are read from the faultless HDDs excluding the auxiliary HDD and the read pieces of data are subjected to a synthesis process in Step ST161. Then, the process proceeds to Step ST162.

In Step ST162, the data obtained by the synthesis process in Step ST161 is subjected to an allocation process again. At this point of the process, the faulty HDD is replaced with a new HDD and one faultless HDD must record a parity. Further, the auxiliary HDD is provided. Therefore, the data is allocated to (N−2) HDDs in this process. Then, the process proceeds to Step ST163.

In Step ST163, a parity is generated for the allocated pieces of data, and the process then proceeds to Step ST164.

In Step ST164, the allocated pieces of data and the parity are recorded in the faultless HDDs and the replaced HDD excluding the auxiliary HDD. Thus, the rebuild process is complete.

According to the aforementioned second embodiment, even if a fault occurs at an HDD, a piece of data recorded in such faulty HDD is recovered, and the recovered piece of data is recorded in the auxiliary HDD. Then, after the pieces of data are synthesized, the synthesized data is reallocated to and recorded in the faultless HDDs excluding the auxiliary HDD. Therefore, even if the synthesized data is read before its reallocation to and recording in the faultless HDDs after a fault has occurred, a piece of data recorded in the faulty HDD has been recovered in the auxiliary HDD. Hence, the data can be read swiftly. Further, once the allocation of the synthesized data has been complete, an HDD can be reserved as an auxiliary one. Still further, even if a fault occurs again at an HDD before the completion of a rebuild process, a piece of data recorded in such newly faulting HDD can be recovered, so that correct, reproduced data can be obtained.

While the disk array unit 20 has been described as being of a RAID level 3 system in the aforementioned second embodiment, a level 4 or 5 unit 20 similarly allows a piece of data recorded in a faulty HDD to be allocated to and recorded in faultless HDDS, so that reliability can be improved.

That is, in case of applying the RAID level 4 or 5 system to the first recovery process shown in FIG. 9, such recovery process will be modified as follows. In the RAID level 4 or 5 system, both a piece of data and a parity are allocated to each HDD, and thus Step ST123 is bypassed. When the answer is positive in Step ST122, Steps ST124, ST125 and ST126 are performed. In Step ST126, the data is reallocated to (N−2) HDDs excluding the faulty and auxiliary HDDs. Then, after a parity has been generated in Step ST127, the reallocated pieces of data and the parity are allocated to and recorded in (N−2) HDDs in Step ST128.

Similarly, in case of applying the RAID level 4 or 5 system to the second recovery process shown in FIG. 12, the following process is performed. In the RAID level 4 system, a parity is recorded in a prescribed HDD as in the level 3 system, and thus the recovery process is performed in a manner similar to that of the level 3 system.

On the other hand, in the level 5 system, the recovery process shown in FIG. 12 is modified as follows. Since both a piece of data and a parity are allocated to and recorded in each HDD, the Step ST151 is determined negatively and Step ST152 is executed. Then, Steps ST153 and ST154 are executed. In Step ST157, the data is reallocated to (N−2) HDDs excluding-the faulty and auxiliary HDDS. Then, after a parity has been generated in Step ST158, the reallocated pieces of data and the parity are allocated to and recorded in (N−2) HDDs in Step ST159.

Further, in the aforementioned embodiment, the volume of a parity PT equals that of each of the pieces of data WS-1 to WS-6 for simplicity of explanation. If the volume of a parity PT differs from that of each of the pieces of data WS-1 to WS-6, similar processes can be performed by modifying the equations (3) to (5) accordingly.

According to the second embodiment, when first data is divided and the divided pieces of data are allocated to a plurality of faultless recording and reproducing means as new pieces of second data, and if these new pieces of second data cannot be recorded in the faultless recording and reproducing means due to the fact that the volume of data in these faultless recording and reproducing means is very large.

What is claimed is:

1. A data recording and reproducing method using a plurality of recording and reproducing means in which, at a time of data recording, pieces of second data are produced by dividing supplied first data and an error correction code is generated for the pieces of second data, and the pieces of second data and the error correction code are allocated to and recorded in the plurality of recording and reproducing means, respectively, and in which, at a time of data reproduction, the first data is reproduced by synthesizing the pieces of second data read from the plurality of recording and reproducing means, said method comprising the steps of:
 a) when a fault occurs at one of the plurality of recording and reproducing means ("hereinafter referred to as the faulty recording and reproducing means"), if one of the pieces of second data is recorded in the faulty recording and reproducing means, reproducing the first data by reading the pieces of second data and the error correction code recorded in the plurality of recording and reproducing means excluding the faulty recording and reproducing means, and if one of the pieces of second data is not recorded in the faulty recording and reproducing means, reproducing the first data by reading the pieces of second data recorded in the plurality of recording and reproducing means excluding the faulty recording and reproducing means; and
 b) producing new pieces of second data by dividing the first data reproduced in the step a) and generating a new error correction code, and allocating and recording the new pieces of second data and the new error correction code to and in the plurality of recording and reproducing means excluding the faulty recording and reproducing means, respectively, wherein each of the plurality of recording and reproducing means has a preset data recording area for recording either one of the pieces of second data or the error correction code; and in the step (b), when there is the faulty recording and reproducing means, and when either one of the new pieces of second data or the new error correction code can be written to each of the data recording areas of the plurality of recording and reproducing means excluding the faulty recording and reproducing means, and thereafter the new pieces of second data and the new error correction code are allocated to and recorded in the plurality of recording and reproducing means excluding the faulty recording and reproducing means, respectively.

2. A data recording and reproducing method according to claim 1, wherein step (b) includes a substep (b-1) for, when there is the faulty recording and reproducing means, determining whether the data recording areas of the plurality of recording and reproducing means excluding the faulty recording and reproducing means has a capacity sufficient for writing either one of the new pieces of second data or the new error correction code therein, and a substep (b-2) for, when it is determined in substep (b-1) that the data recording areas of the plurality of recording and reproducing means excluding the faulty recording and reproducing means has a capacity sufficient for writing either one of the new pieces of second data or the new error correction code therein, for allocating and recording the new pieces of second data and the new error correction code to and in the plurality of recording and reproducing means excluding the faulty recording and reproducing means, respectively.

3. A data recording and reproducing method according to claim 2, wherein a number of the recording and reproducing means is three, and, in substep (b-2), the new pieces of second data and the new error correction code are allocated to and recorded in the plurality of recording and reproducing means excluding the faulty recording and reproducing means under a RAID level 1, respectively.

4. A data recording and reproducing method using a plurality of recording and reproducing means in which, at the time of data recording, pieces of second data are produced by dividing supplied first data and error correction codes are generated for the pieces of second data, and both one of the pieces of second data and one of the error correction codes are allocated to and recorded in each of the plurality of recording and reproducing means, and in which, at the time of data reproduction, the first data is reproduced by synthesizing the pieces of second data read from the plurality of recording and reproducing means, the method comprising the steps of:
a) when a fault occurs at one of the plurality of recording and reproducing means (hereinafter referred to as the "faulty recording and reproducing means"), reproducing the first data by reading the pieces of second data and the error correction codes recorded in the plurality of recording and reproducing means excluding the faulty recording and reproducing means; and
b) producing new pieces of second data by dividing the first data reproduced in the step a) and generating new error correction codes, and allocating and recording both one of the new pieces of second data and one of the new error correction codes to and in each of the plurality of recording and reproducing means excluding the faulty recording and reproducing means, wherein each of the plurality of recording and reproducing means has a preset data recording area for recording one of the pieces of second data and one of the error correction codes; and in the step (b), when there is the faulty recording and reproducing means, and when both one of the new pieces of second data and one of the new error correction codes can be written to each of the data recording areas of the plurality of recording and reproducing means excluding the faulty recording and reproducing means, and thereafter both one of the new pieces of second data and one of the new error correction codes are allocated to and recorded in each of the plurality of recording and reproducing means excluding the faulty recording and reproducing means.

5. A data recording and reproducing method according to claim 4, wherein in step (b), when there is a faulty recording and reproducing means, determining whether the data recording areas of the plurality of recording and reproducing means has a capacity sufficient for writing both one of the new pieces of second data and one of the new error correction codes therein, and a substep (b-2), when it is determined in substep (b-1) that the data recording areas of the plurality of recording and reproducing means excluding the faulty recording and reproducing means has a capacity sufficient for writing both one of the new pieces of second data and one of the new error correction codes therein, for allocating and recording both one of the new pieces of second data and one of the new error correction codes to and in each of the plurality of recording and reproducing means excluding the faulty recording and reproducing means.

6. A data recording and reproducing method according to claim 5, wherein a number of the recording and reproducing means is three, and, in substep (b-2), the new pieces of second data and the new error correction code are allocated to and recorded in the plurality of recording and reproducing means excluding the faulty recording and reproducing means under a RAID level 1, respectively.

7. A data recording and reproducing method using a plurality of recording and reproducing means in which, at the time of data recording, pieces of second data are produced by dividing supplied first data and an error correction code is generated, and the pieces of second data and the error correction code are allocated to and recorded in the plurality of first recording and reproducing means, respectively, and in which, at the time of data reproduction, the first data is reproduced by synthesizing the pieces of second data read from the plurality of first recording and reproducing means, and in which each of the plurality of first recording and reproducing means has a preset data recording area for recording either one of the pieces of second data or the error correction code, the method comprising the steps of:
a) when a fault occurs at one of the plurality of first recording and reproducing means (hereinafter referred to as the "faulty first recording and reproducing means"), if one of the pieces of second data is recorded in the faulty first recording and reproducing means, reproducing the first data by reading the pieces of second data and the error correction code recorded in the plurality of first recording and reproducing means excluding the faulty first recording and reproducing means, and if one of the pieces of second data is not recorded in the faulty first recording and reproducing means, reproducing the first data by reading the pieces of second data recorded in the plurality of first recording and reproducing means excluding the faulty first recording and reproducing means; and b) when new pieces of second data are produced by dividing the first data reproduced in the step a) based on a number of the plurality of first recording and reproducing means excluding the faulty first recording an reproducing means and a new error correction code is generated and the new pieces of second data and the new error correction code are allocated to the plurality of first recording and reproducing means excluding the faulty first recording and reproducing means, respectively, if one of the new pieces of second data or the new error correction code cannot be written to each of the data recording areas of the plurality of first recording and reproducing means excluding the faulty first recording and reproducing means, further producing new pieces of second data by dividing the reproduced first data based on a number of the plurality of first recording and reproducing means excluding the faulty first recording and reproducing means and a second recording and reproducing means and further generating a new error correction code, and allocating and recording the further newly produced pieces of second data and the further newly generated error correction code to and in the plurality of first recording and reproducing means excluding the faulty first recording and reproducing means and the second recording and reproducing means, respectively.

8. A data recording and reproducing method according to claim 7, wherein step (b) includes a substep (b-1), when new pieces of second data are produced by dividing the first data reproduced in step a) based on a number of the plurality of first recording and reproducing means excluding the faulty first recording and reproducing means and the new error correction code is generated and the new pieces of second data and the new error correction code are allocated to the plurality of first recording and reproducing means excluding the faulty first recording and reproducing means, respectively, for determining whether the data recording areas of the plurality of first recording and reproducing means excluding the faulty first recording and reproducing means has a capacity sufficient for writing one of the new pieces of second data or the new error correction code therein, and a substep (b-2) for, when it is determined in substep (b-1) that the data recording areas of the plurality of first recording and reproducing means excluding the faulty first recording and reproducing means has a capacity insufficient for writing one of the new pieces of second data or the new error correction code therein, producing the new pieces of second data by dividing the reproduced first data based on a number of the plurality of first recording and reproducing means excluding the faulty first recording and reproducing means and the second recording and reproducing means and further generating the new error correction code, and allocating and recording the further newly produced pieces of second data and the further newly generated error correction code to and in the plurality of first recording and reproducing means excluding the faulty first recording and reproducing means and the second recording and reproducing means, respectively.

9. A data recording and reproducing method using a plurality of recording and reproducing means in which, at the time of data recording, pieces of second data are produced by dividing supplied first data and error correction codes are generated, and both one of the pieces of second data and one of the error correction codes are allocated to and recorded in each of the plurality of first recording and reproducing means, and in which, at the time of data reproduction, the first data is reproduced by synthesizing the pieces of second data read from the plurality of first recording and reproducing means, and in which each of the plurality of first recording and reproducing means has a preset data recording area for recording one of the pieces of second data and one of the error correction codes, the method comprising the steps of:

a) when a fault occurs at one of the plurality of first recording and reproducing means (hereinafter referred to as the "faulty first recording and reproducing means"), reproducing the first data by reading the pieces of second data and the error correction codes recorded in the plurality of first recording and reproducing means excluding the faulty first recording and reproducing means; and b) when new pieces of second data are produced by dividing the first data reproduced in the step a) based on a number of the plurality of first recording and reproducing means excluding the faulty first recording and reproducing means and new error correction codes are generated and both one of the new pieces of second data and one of the new error correction codes are allocated to each of the plurality of first recording and reproducing means excluding the faulty first recording and reproducing means, if both one of the new pieces of second data and one of the new error correction codes cannot be written to each of the data recording areas of the plurality of first recording and reproducing means excluding the faulty first recording and reproducing means, further producing new pieces of second data by dividing the reproduced first data based on a number of the plurality of first recording and reproducing means excluding the faulty first recording and reproducing means and a second recording and reproducing means and further generating new error correction codes, and allocating and recording both one of the further newly produced pieces of second data and one of the further newly generated error correction codes to and in each of the plurality of first recording and reproducing means excluding the faulty first recording and reproducing means and the second recording and reproducing means.

10. A data recording and reproducing method according to claim 9, wherein step (b) includes a substep (b-1), when new pieces of second data are produced by dividing the first data reproduced in step a) based on a number of the plurality of first recording and reproducing means excluding the faulty first recording and reproducing means and new error correction codes are generated and both one of the new pieces of second data and one of the new error correction codes are allocated to each of the plurality of first recording and reproducing means excluding the faulty first recording and reproducing means, for determining whether the data recording areas of the plurality of first recording and reproducing means excluding the faulty first recording and reproducing means has a capacity sufficient for writing both one of the new pieces of second data and one of the new error correction codes, and a substep (b-2) for, when it is determined in substep (b-1) that the data recording areas of the plurality of first recording and reproducing means excluding the faulty first recording and reproducing means has a capacity insufficient for writing both one of the new pieces of second data and one of the new error correction codes, further producing the new pieces of second data by dividing the reproduced first data based on a number of the plurality of first recording and reproducing means excluding the faulty first recording and reproducing means and the second recording and reproducing means and further generating new error correction codes, and allocating and recording both one of the further newly produced pieces of second data and one of the further newly generated error correction codes to and in each of the plurality of first recording and reproducing means excluding the faulty first recording and reproducing means and the second recording and reproducing means.

* * * * *